(12) United States Patent
Dunn et al.

(10) Patent No.: US 9,596,236 B2
(45) Date of Patent: Mar. 14, 2017

(54) METHOD FOR VERYIFYING AUTHORIZED SIGNER FOR MOBILE DEVICE BASED DOCUMENT ESCROW SERVICE

(71) Applicant: CITRIX SYSTEMS, INC., Fort Lauderdale, FL (US)

(72) Inventors: Cary Dunn, Santa Barbara, CA (US); Daryl Bernstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/248,832

(22) Filed: Apr. 9, 2014

(65) Prior Publication Data

US 2015/0295922 A1 Oct. 15, 2015

(51) Int. Cl.
*H04L 29/06* (2006.01)
*H04L 9/32* (2006.01)
*G06F 21/32* (2013.01)
*G06F 17/30* (2006.01)
*H04W 12/06* (2009.01)
*H04W 12/10* (2009.01)

(52) U.S. Cl.
CPC .... *H04L 63/0861* (2013.01); *G06F 17/30011* (2013.01); *G06F 21/32* (2013.01); *H04L 9/3247* (2013.01); *H04L 63/0823* (2013.01); *H04W 12/06* (2013.01); *H04W 12/10* (2013.01)

(58) Field of Classification Search
CPC . H04L 63/0861; G06F 21/32; G06F 17/30011
See application file for complete search history.

(56) References Cited

U.S. PATENT DOCUMENTS

| | | | | |
|---|---|---|---|---|
| 6,434,619 B1 * | 8/2002 | Lim | ................... | H04L 41/0213 709/200 |
| 8,468,608 B1 * | 6/2013 | Hernacki | ................ | G06F 21/10 726/1 |
| 8,924,729 B1 * | 12/2014 | Oakes, III | ..................... | 713/176 |

(Continued)

OTHER PUBLICATIONS

Newham, "Signature Verification Technologies", Apr. 2000, pp. 8-10.*

(Continued)

*Primary Examiner* — Thanhnga B Truong
*Assistant Examiner* — Thaddeus Plecha
(74) *Attorney, Agent, or Firm* — BainwoodHuang

(57) ABSTRACT

A method for authenticating a user to a document escrow service includes steps of logging a mobile phone onto a mobile network, wherein the mobile phone has a biometric sensor, a display, an input apparatus, and a non-transient memory in communication with a processor, and opening a signature application on the mobile device. The method further includes reading the biometric sensor and sending, via the mobile network, biometric data collected from the reading of the biometric sensor to a document execution server or a manufacturer application server. The method further includes receiving, at the mobile phone a permission signal and, dependent upon the permission signal received, using the mobile device to either allow or not allow a web ready document to be signed and returned to the document execution server.

24 Claims, 34 Drawing Sheets

(56) References Cited

U.S. PATENT DOCUMENTS

| | | | |
|---|---|---|---|
| 2002/0066041 A1* | 5/2002 | Lemke | G06F 21/32 726/2 |
| 2002/0095601 A1 | 7/2002 | Hind et al. | |
| 2007/0283011 A1* | 12/2007 | Rakowski | H04L 41/0803 709/225 |
| 2008/0034068 A1* | 2/2008 | Vaughan | G06Q 10/10 709/220 |
| 2009/0049542 A1* | 2/2009 | DeYonker et al. | 726/18 |
| 2009/0235082 A1* | 9/2009 | Garrett | H04L 9/3281 713/178 |
| 2009/0327144 A1 | 12/2009 | Hatter et al. | |
| 2011/0145904 A1* | 6/2011 | Pizano et al. | 726/7 |
| 2011/0179289 A1* | 7/2011 | Guenther | 713/189 |
| 2012/0260096 A1* | 10/2012 | Balinsky et al. | 713/176 |
| 2012/0284602 A1* | 11/2012 | Seed et al. | 715/224 |
| 2014/0074713 A1* | 3/2014 | Neuwirth | G06Q 20/20 705/44 |
| 2014/0214673 A1* | 7/2014 | Baca et al. | 705/44 |
| 2014/0279516 A1* | 9/2014 | Rellas et al. | 705/44 |
| 2014/0359291 A1* | 12/2014 | Wilson et al. | 713/168 |
| 2014/0359722 A1* | 12/2014 | Schultz | H04L 9/3231 726/5 |

OTHER PUBLICATIONS

International Search Report for International Application No. PCT/US2015/024884, mailed from the International Searching Authority on Jul. 14, 2015, 9 pages.

* cited by examiner

FLAG USER-1xxxxxxxx [ user-1 1       ] xxxxxxxxxxx [ user-2     ] xxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxx xxxxxxxxxxxxx x xxxxxxxxxxxxxxxxxxxx
xxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxx
FLAG USER-1        xxxxx [ user- 1]xxxxxxxxxxxxxxxxxxxxxxxxxxxxxxxx xxx
xxxxxxxxxxxxxxxxxxxxxxxxxxxxxxxxxxxx[ user- 2    ]xxxxxxxxxxxxxxxxxxx
xxxxxxxxxxxxxxxxxxxxxxxxxxxxxxxxxxxxxxxxxxxxxxxxxxxxxxxxxxxxxxxxxxx
FLAG USER-1    [ user-1 ]                [ user-2 ]
              Xxxxxxxxxxxxx              xxxxxxxxxxxxxxxxx

Fig. 7A

FLAG USER-2xxxxxxxx [ user-12   ] xxxxxxxxxxxx [ user-21   ] xxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxx xxxxxxxxxxxxxx x xxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
FLAG USER-2      xxxx [ user- 2]xxxxxxxxxxxxxxxxxxxxxxxxxxxxxxxxx xxx
xxxxxxxxxxxxxxxxxxxxxxxxxxxxxxxxxxxxx[ user- 1   ]xxxxxxxxxxxxxxxxxx
xxxxxxxxxxxxxxxxxxxxxxxxxxxxxxxxxxxxxxxxxxxxxxxxxxxxxxxxxxxxxx
FLAG USER-2    [ user-1 ]              [ user-2  ]
              Xxxxxxxxxxxx              xxxxxxxxxxxxxxxxx

Send Document

Choose a Document
NDA_mutual_pdf
Size: 105kb
Pages: 5
Origin: Document from Template
1 of 5

People Involved
- Martin Santos    martin@santos.com
- Jul

[Add Signer] [Add CC]

Description

[NEXT STEP]

| Expires in | ON |
| Signature Locations and Form Fields | ON |
| Signer Sequencing | ON |
| Add ags | OFF |

METHOD FOR VERYIFYING AUTHORIZED SIGNER FOR MOBILE DEVICE BASED DOCUMENT ESCROW SERVICE

BACKGROUND OF THE INVENTION

This invention relates generally to authenticating documents and more particularly to methods for escrowing electronically signed documents with reliable authentication.

The disclosures of all of the following provisional and utility patent applications are incorporated by reference herein: U.S. provisional patent application Ser. No. 61/253,778, filed Oct. 21, 2009, entitled "Improved Systems and Methods for Document Signing"; U.S. patent application Ser. No. 12/908,827, filed on Oct. 20, 2010, entitled "Document Signing Systems and Methods," U.S. patent application Ser. No. 12/908,840, filed on Oct. 20, 2010, entitled "Computer Form Action Zone Summary System and Method," and U.S. patent application Ser. No. 12/908,847, filed on Oct. 20, 2010, entitled "Form Completion Rate Enhancement System and Method." This application does not rely for priority on the U.S. patent applications listed above nor is a claim made of benefit from the filing date of the U.S. provisional patent application.

Businesses and individuals rely on legally executed documents in a variety of contexts, from completion of complex forms used by governments and institutions (e.g., insurance forms, car loan and purchase forms, and the like), to simple contracts between individuals (e.g., lease agreements, wills, and a host of miscellaneous arrangements), with a range of contracts in between.

Documents signed by overnight envelope take a minimum of one day to reach the recipient and an additional day to be returned. Due to intra-office distribution delays and recipients' tendency to put paper documents in to-do piles, the average cycle time using overnight envelopes is 5-7 days. Documents signed by fax have an average cycle time of 2-3 days, due to intra-office delays, procrastination of paper document tasks, and fax machine mishaps. Faced with the burden of signing a paper document and returning it by fax, scan, or mail, many recipients put it down on their desk and forget about it.

As a result, users are increasingly turning to exchanging executed documents online. These documents not only include a field for including a signature, such as the type described above, but may be more complex to include additional fields that may require the signer to initial, sign, or take some other action. To guarantee the authenticity of such documents, electronic copies of the documents may be kept in storage by a third-party electronic document escrow server.

Nevertheless, even the authenticity of document held by a third party escrow service may be questioned at some time. For example, written signature information, such as the shape of the signature, may be falsified by someone who surreptitiously obtained login data from a user, such as an email login. In this case, an emailed link to a secured document may fall into the wrong hands and the signature falsified as is done on paper documents. Determining whether the signature is real could become a job for a handwriting forensic analyst, which could make all the data carried by the electronic copy no better proof of valid execution than a handwritten paper and ink signature. In another case, a signature could be coerced by another party and/or the document executed on a machine other than that owned by the purported document signer. In yet another case, a device owned by the document signer may be stolen and unlocked (if it ever was locked) by another party, who fakes a signature of the purported document signer. In yet other cases, one of the parties may, for their own reasons, dispute the authenticity of a signature.

Thus, the authenticity of the signatures on an electronic document escrowed by a third party service is no better than the authenticity data collected along with an escrowed electronic document. To the extent that any of this data is unreliable or "hackable," there is a chance that a stored document may not represent a validly executed document.

Furthermore, it is known that when a person clicks on a link on a cell phone browser or application, a document can be sent (i.e., downloaded) via email or via a link sent via email or other electronic method, such as a text message. The downloaded document can be filled out and signed by a possessor of any cell phone having access to a website or email server on which the downloaded document can be accessed. At best, if a document is downloaded and signed, all that might be proved in some cases is that someone who had access to an email account of the intended recipient downloaded and signed the document. There may be associated biometric data indicating how the document was signed, or there may be data indicative of only an image of a signature, but these indications may not be sufficient to verify the actual signer in at least some cases.

Some cell phone manufacturers such as Apple (e.g., iPhone 5) require or allow fingerprint recognition for unlocking certain of their cell phones, but do not now provide (nor have indicated that they will ever provide) accessibility to the fingerprint recognition device via an API for application developers. In addition, out of privacy concerns, many cell phones users may be wary of having their fingerprints accessible to many different application developers.

There is thus a need for apparatus and methods to enhance the reliability of the authenticity data stored along with escrowed electronic documents, and a related but separate preference to avoid collecting data that users of cell phones and other mobile devices would feel was an invasion of their privacy.

SUMMARY OF THE INVENTION

In one aspect, some configurations of the present invention therefore provide a method for authenticating a user to a document escrow service that includes steps of logging a mobile phone onto a mobile network, wherein the mobile phone has a biometric sensor, a display, an input apparatus, and a non-transient memory in communication with a processor, and opening a signature application on the mobile phone device. The method further includes reading the biometric sensor and sending, via the mobile network, biometric data collected from the reading of the biometric sensor to a document execution server, a third party database or a manufacturer application server. The method further includes receiving, at the mobile phone a permission signal and, dependent upon the permission signal received, using the mobile device to either allow or not allow a web ready document to be signed and returned to the document execution server.

In another aspect, some configurations of the present invention provide a method for authenticating a user to a document escrow service. The method, in this aspect, includes steps of logging a mobile phone onto a mobile network. The mobile device logged into the mobile network includes a biometric sensor, a display, an input apparatus, and a non-transient memory in communication with a processor. The method further includes steps of opening a signature application on the mobile phone, reading the biometric sensor to collect biometric data and comparing the collected biometric data from the read biometric sensor to biometric data already stored in the mobile device. The method also includes a step which is dependent upon results of the comparison, namely, using the mobile phone to either allow or not allow a web ready document to be signed and returned to a document execution server via the mobile network.

In yet another aspect, some configurations of the present invention provide a method for authenticating a user to a document escrow service. In this aspect, the method includes a step of logging a mobile phone onto a mobile network. The mobile phone has within it a biometric sensor, a display, an input apparatus, and a non-transient memory in communication with a processor. The method further includes steps of opening a signature application on the mobile phone, reading the biometric sensor, and sending, via the mobile network, biometric data collected from the reading of the biometric sensor via the mobile network to a document execution server. The method further includes receiving, via the mobile network, a permission signal at the mobile phone from the document execution server and, dependent upon the permission signal received, using the mobile phone to either allow or not allow a web ready document to be signed and returned via the mobile network to the document execution server.

Still further, in some configurations the mobile phone is used to access a web browser which is running the signature application.

Except as otherwise explicitly stated in this description, the mobile phone may instead be another mobile device, such as a tablet computer.

It will be appreciated that some configurations of the present invention provide enhanced reliability of authenticity data stored along with escrowed electronic documents, as well as the avoidance, in some embodiments, of the collection of certain types of data that users of cell phones and other mobile devices might perceive as an invasion of their privacy.

Generally, in a broad aspect, the present invention, generally, comprises a method for authenticating a user to a document escrow service, the method comprising the steps of:

(a) logging into a mobile device of the group consisting of mobile phones and tablet computers onto a mobile network, said mobile device having a biometric sensor, a display, an input apparatus, and a non-transient memory in communication with a processor in said mobile device;

(b) opening on the mobile device a signature application which allows a document to be signed;

(c) reading the biometric sensor;

(d) sending, via the mobile network, biometric data collected from the reading of the biometric sensor via the mobile network to at least one member of an authentication group selected from the group consisting of a document execution server, a third party data base and a manufacturer application server;

(e) receiving, at the mobile device, from said member of the authentication group, a permission signal for indicating a match or a non-match between the biometric data on the mobile device and the at least one member; and (f) depending upon the permission signal received, the signature application allowing the document to be signed and returned to the document execution server if there is a match or not allowing the document to be signed if there is no match.

In still another embodiment, the present invention provides a method for authenticating a user to a document escrow service, which includes the steps of:

(a) logging a mobile device of the group consisting of mobile phones and tablet computers onto a mobile network, said mobile device having a biometric sensor, a display, an input apparatus, and a non-transient memory in communication with a processor in said mobile device;

(b) opening a signature application on the mobile device;

(c) reading the biometric sensor;

(d) comparing the collected biometric data from the biometric sensor to biometric data previously stored in the mobile device;

(e) signaling a successful comparison to the signature application on the mobile device, and (f) depending upon a successful comparison, the signature application on the mobile device allowing a document to be signed and returned to a document execution server via the mobile network.

For a more complete understanding of the present invention reference is made to the following detailed description and accompanying drawing. In the drawing like reference characters refer to like parts throughout the several views, in which:

BRIEF DESCRIPTION OF THE DRAWINGS

FIGS. 7A and 7B are graphical representations of screenshots of an embodiment of the present invention.

FIGS. 11A-11M are screenshots of a computer performing the method.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry of every possible embodiment.

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. Still further, as used herein and in the appended claims, the term "biometric data" is intended to include a fingerprint as well as an encrypted token of a fingerprint which may be embedded with a document.

A technical result of at least one configuration of the present invention is the operation of one or more biometric sensors to authenticate a user to a signature server.

Generally, the present system and method are directed to authenticating documents and more particularly to methods and apparatus for escrowing electronically signed documents with reliable authentication.

Figure 1:
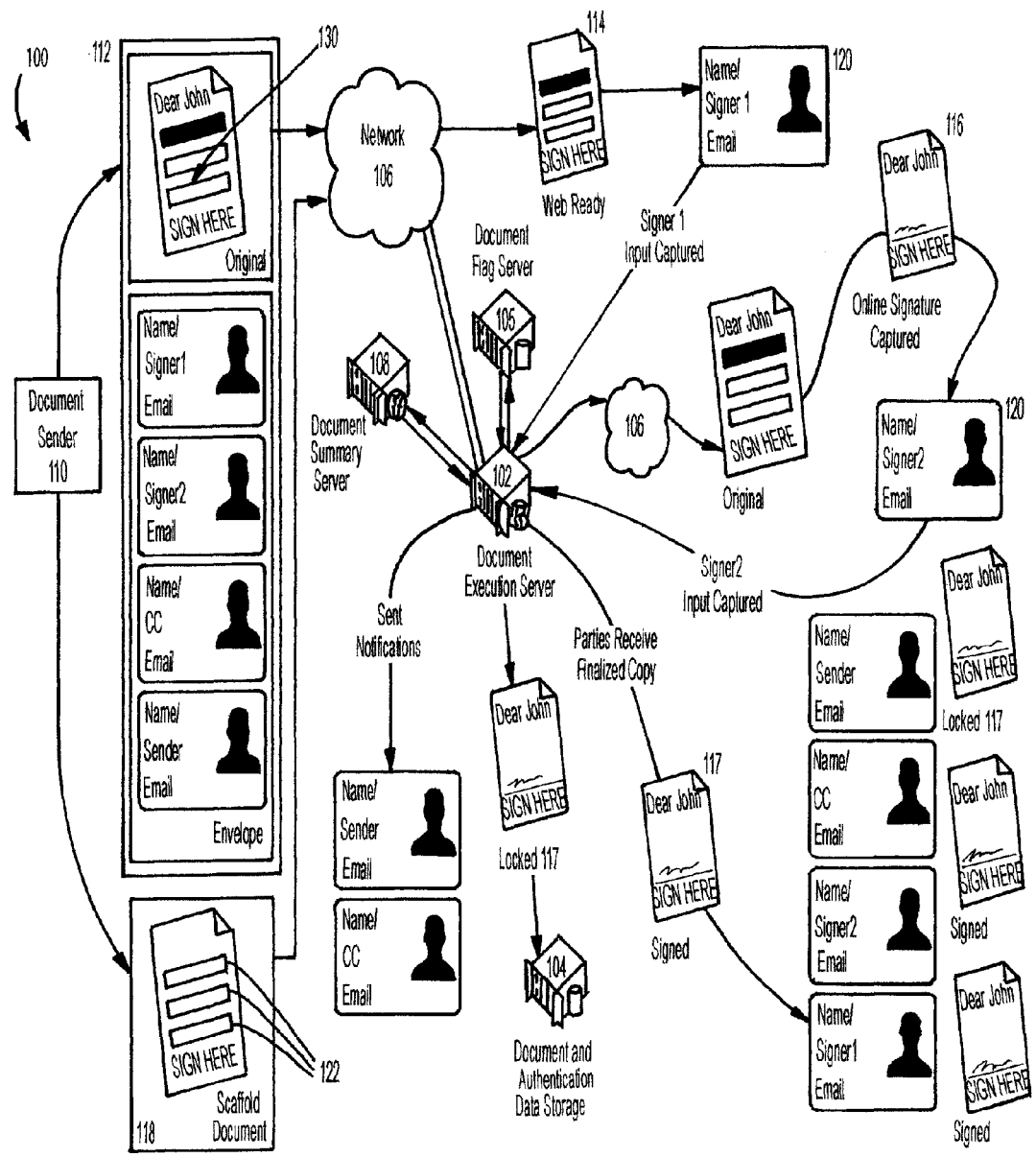
FIG. 1 shows a system chart of an embodiment of the present system.

As used herein, a signer user 120 as seen in FIG. 1 may be the document sender or one or more third parties. In addition, the term "signature field", as used herein, includes entry fields for information or data that may include signatures, signer name, unique signer identifiers, signature initials, addresses, or any other information that a document sender may identify as being acceptable forms of information for a particular signature field. For example, in one real estate transaction document, one signature field type may require entry of the signer user's full, legal name, another signature field type may require entry of the target real property address, another signature field type may include date data, and such. Thus, for example only and not by way of limitation, a "signature field" may be provided as an entry field for some form of identification, or it may be provided as a simple text entry field where a signer user 120 may type anything.

In addition, the term "signature" includes any biometric action by a signer user, such as: freehand motion using a mouse, electronic pen, touch-screen, or any other method for detecting and recording (either temporarily or in a stored location) graphics unique or capable of being associated with a particular signer user. It may also include iris or other eye scan data, fingerprints, vocal sound or voiceprints, or other available biometrics. The freehand motion may either approximate, electronically, the signer user's traditional signature (i.e., as performed with a pen or pencil on paper), or may be a graphic that is quite dissimilar from the signer user's traditional signature.

For present purposes, a "signature field" can be thought of as a generic term for different types of fields. Examples of "signature fields" include, a "data entry field," or synonymously, an "information entry field" into which text is typed (for example), a "signature entry field" into which graphical or other data uniquely associated with a particular signer user is entered, and a "biometric field" into which a signature or other type of biometric data that is uniquely associated with a particular signer user is entered. The term "biometric field" may be considered a more generic form of a "signature entry field." The term "signature entry field" should, however, be distinguished from the more generic term "signature field." It may help to illustrate the hierarchy:

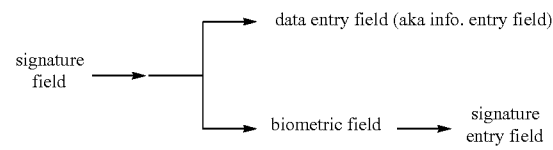

For example and referring to FIG. 1, with respect to the signing of an unsigned electronic document, some embodiments of the present system 100 include a document execution server (DES) 102 in communication with a document and authentication data storage device 104, a document summary server 108, and a document flag server 105. The document execution server 102 is configured to receive over a network 106 from a document sender 110 a scaffold document 118 that contains one or more information entry fields 122, together with additional data representative of the identities of signer users (who are to sign the electronic document) and parties to be copied (the "envelope" information).

As further shown in FIG. 1, some embodiments 100 also include a document summary server 108 is in communication with the document execution server 102, and associated with a scaffold electronic document 118 via network 106, described in further detail below. The document summary server 108 facilitates the entry by a signer user 120 of information into one or more information entry fields 122 in a scaffold document 118.

Figure 2A:
FIG. 2A is a screen shot of unsigned electronic documents as used in an embodiment of the present system and method.

The system 100 further includes a document flag server 105 in communication with the document execution server 102 and associated scaffold electronic document 118 via network 106, described in further detail below. Referring now to FIG. 1 and FIG. 2A, the document "flag" server 105 associates one or more "flags" (a signal or alert, such as a graphical representation of a "sign here" flag) 126 with signature fields 130 in an unsigned electronic document 112, so that a signer user 120 can easily identify where a signature or other information is required to be entered in the document. In an embodiment, the document execution server 102 obtains flag data from the document flag server 105, and associates a visual flag 126 in a location on the unsigned electronic document 112 with the unsigned electronic document 112 prior to sending the document to a signer user 120.

Figure 2B:
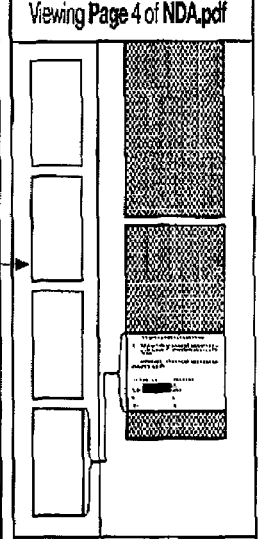
FIG. 2B is a screen shot of unsigned electronic documents as used in an embodiment of the present system and method.

Additionally referring now to FIG. 2B, and returning now to the document execution server 102, that server sends, or otherwise makes available the unsigned electronic document 112, with or without including an information summary indicator 124 from the document summary server 108 and/or a flag 126 from the document flag server 105, to one or more signer users 120, identified by the document sender 110. Once each target signer user 120 completes all designated signature fields for that signer user, the document execution server 102 converts the original unsigned electronic document 112 into a (partially) signed electronic document 116. Once all target signer users 120 have completed all designated signature fields, the input is combined to generate a signed electronic document 117. The signed electronic document 117 may be logged and stored in the document and authentication data storage device 104 for future use.

The document execution server 102 may send notifications to the document sender 110 as well as other designated signer users 120, indicating the progress of the signing activity. For example, the notifications may identify signature fields in the electronic document still requiring entry of data by one or more of the signer users.

In some example embodiments and referring to FIG. 2A, a screenshot of an unsigned electronic document 112 is presented with a graphical flag 126 in the left margin of the screen displaying the document. In some of these embodiments, the flag is a brightly-colored "tab" that includes the text "required", to identify for the signer user 120 that there is a signature field 130 along the same visual line on the screen that requires the signer user to complete. In some embodiments, the flags 126 are a graphical equivalent of a sticky label, which appear to stick out of or wrap around the edge of the document as an indicator to the signer user. In some embodiments and referring to FIG. 2B, a display of an unsigned electronic document 112 having multiple signature fields 130 is provided. The unsigned electronic document 112 includes content displayable to a signer user 120 as text, graphics, or a combination of text and graphics. The unsigned electronic document 112 includes one or more signature fields 130, into which data is entered by signer users 120 at one or more locations on the pages of the electronic document 112 using online signature entry pads 132 (shown in FIG. 11K) associated with each signature entry field 130, as described in further detail below. The location, type, and number of signature fields 130 per document are specified by the document sender 110 to the document execution server 102. The document execution server 102 associates the signature fields 130 identified by the document sender 110, and presents the unsigned electronic document 112, including all signature fields 130, to the respective signer users 120 identified by the document sender 110. In some embodiments and referring to the right side of FIG. 2B, the progress in signing (or otherwise completing the signature fields for a signer user) is indicated by an information summary indicator 124, which is shown in this FIG. 2B as a "thermometer-type" graphic. The example electronic document 112 shown in FIG. 2B is for a Chief Executive Officer signer user, displaying a signature field 130.

In at least one example embodiment, the document execution server 102 converts the original unsigned electronic document 112 into an unsigned web-ready document 114, having the same information and signature fields 130 as the original document. Unsigned web-ready documents are ready for dynamic entry of information into the signature fields 130 by one or more signer users 120. This web-ready conversion of the original documents may be achieved using standard conversion software and algorithms readily available and known to those skilled in the relevant art. For example, a Microsoft Word Document can be opened in the OpenOffice Application, exported as a PDF and then, using pdf2swf from SWFTOOLS.org, exported in Flash format, which readily is displayable in most generally commercially available web browsers. In at least one embodiment, the unsigned electronic document 112 is exported using similar tools into PNG files, which are supported by commercially available web browsers, and which technology is available in services such as DOCSTOC.com and SCRIBD.com.

After receiving the original unsigned electronic document 112 and, as applicable, converting the document to an unsigned web-ready document 114, in an example embodiment, the document execution server 102 makes available, via a network, either the original, unsigned electronic document 112 or the unsigned web-ready document 114 to a signer user 120, together with an online signature entry pad 132 associated with each signature field 130 in the unsigned electronic document 112. In an embodiment, the document execution server 102 makes the unsigned electronic document 112 available to multiple signer users 120, either simultaneously or serially, depending on instructions from the document sender 110, or other external, predetermined parameters and input. In at least one example embodiment, the document execution server 102 delivers the unsigned electronic document 112 (or a link thereto) via an application programming interface (API) for access by predetermined signer users. In another example embodiment, document execution server 102 delivers the unsigned web-ready document 114 (or a link thereto) via the API. Alternatively, the link can access a document displayed on a web browser and the signer user observes an image of the document.

In at least one embodiment, also as shown in FIG. 1, the document summary server 108 may send a scaffold document 118 via email or other electronic transmission to one or more signer users 120. The same scaffold document 118 is made available to multiple signer users 120 either in a web ready format, via email, via a link through an API, or using other electronic means, as may be desirable for each signer user 120, as is the case with any unsigned electronic document. For example, in one embodiment, a link to a scaffold electronic document 118 is emailed by document summary server 108 to one or more signer users 120, where the link provides access to a webpage containing or otherwise providing access to a web-ready document 114.

Figure 3:
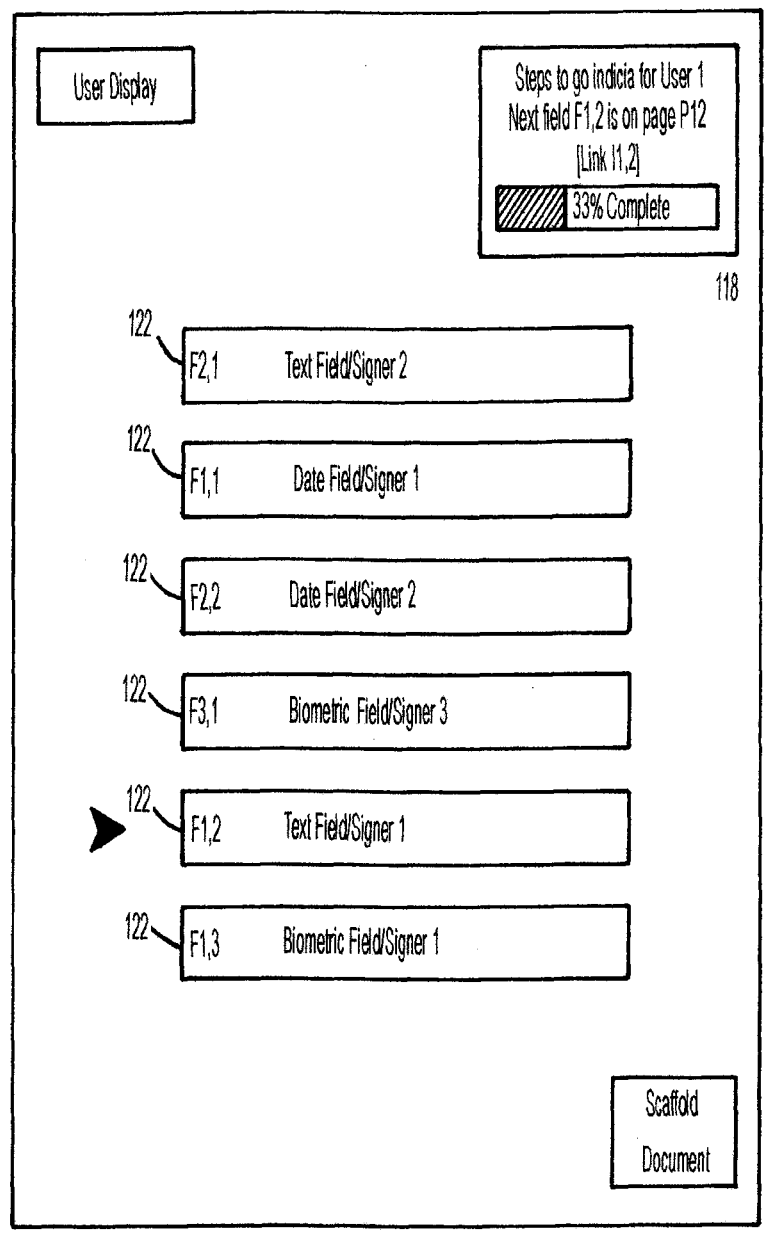
FIG. 3 is a screen shot of an unsigned electronic document as used in an embodiment of the present system and method.

FIG. 3 shows an embodiment of an electronic scaffold document 118 of the present system and method. As shown, the scaffold document 118 includes multiple and different fields F for the $i^{th}$ user $U_i$. In this illustrated embodiment, the document sender 110 designates a number of text fields, date fields, biometric fields, or others that are associated with each signer user 120. In the example, there are three signer users m=3. For the first signer user $U_1$, there are three fields to fill (n=3). Thus, $F_{2,1}$ corresponds to the first signature field 130 for the second signer user 120. Similarly, $F_{1,1}$ corresponds to the first signature field 130 (FIG. 2B) for the first signer user 120, and so forth.

In response to receipt of the signature data from one or more of the signer users 120, the document execution server 102 generates a signed (or otherwise "filled-in" or completed) electronic document 117 corresponding to the unsigned electronic document 118 and including the signature data.

In an embodiment, the signed electronic document 117 then is made available by the document execution server 102 to all or a predetermined subset of the signer users 120 and to the document sender 110 for verification, confirmation, and other predetermined actions. In an embodiment, the document execution server 102 transmits the signed (or otherwise completed) electronic document 117 (in a "locked" form) to a document and authentication data storage device 104.

In an embodiment, the document summary server 108 establishes a group index i for each of the m groups of information entry fields F 122. For purposes of this document, we use the following definitions. With respect to signer users 120, m=number of users/groups of user fields, (e.g. the number of participant signer users), wherein $1<=i<=m$. In addition, $U_i$ represents the $i^{th}$ signer user. In referencing signature field groups for a signer user, $F_i$ is the group of fields required to be "filled in" by the signer user $U_i$, i.e., for the $i^{th}$ signer user. $I_i$ is the incomplete (i.e., not "filled in") required fields for $U_i$. $C_i$ is the required fields completed by $U_i$. When a field $F_{i,j}$ is fully filled in, then $I_{i,j}$ becomes an empty entry which is ignored for counting purposes and skipped when iterating through elements. The same is true for $C_{i,j}$. Counts are represented as: $|F_i|$ is the total required field count for $U_i$; $|I_i|$ is the incomplete required field count for $U_i$; and $|C_i|$ is the completed required field count for $U_i$, all at any given time.

Individual fields are represented as: $F_{i,j}$ is the field j for $U_i$; $P_{i,j}$ is the page number on which $I_{i,j}$ appears; $L_{i,j}$ is the actionable link to bring $F_{i,j}$ to the viewport (for example, if $F_{i,j}$ is offscreen to a signer user 120, clicking a link $L_{i,j}$ will bring $F_{i,j}$ into the middle of the user screen and make the field active for input by the signer user 120; and $Z_{i,j}$ is the visual indicator of next $I_{i,j}$ to be completed by the signer user. Thus, $1<=j<=|F_i|$.

Upon receiving a scaffold document 118, from a document sender 110, the document summary server 108 establishes a group index i for each of the m groups of information entry fields, where $1 \leq i \leq m$, and establishes a subgroup index $j_i$ for the $i^{th}$ group of information entry fields $I_{i,ji}$ of the respective m groups, where $1 \leq i \leq m$ and where $1 \leq j_i \leq n_i$, wherein i and $j_i$ for the $i^{th}$ user have initial values equal to 1 for the scaffold electronic document, and i and $j_i$ have maximum values equal to m and $n_i$ respectively for the scaffold electronic document. The document summary server 108 makes available over the network 106, a version of the scaffold document 118 to one or more signer users 120. The scaffold document 118 is displayable to each signer user 120 to allow the signer user 120 to identify the information entry fields 122. As used herein, the term "information entry field" has the same meaning as "signature field;" however, the term "information entry fields" is preferred in reference to scaffold documents, and the term "signature fields" is preferred in reference to any unsigned electronic document.

Figure 4A:
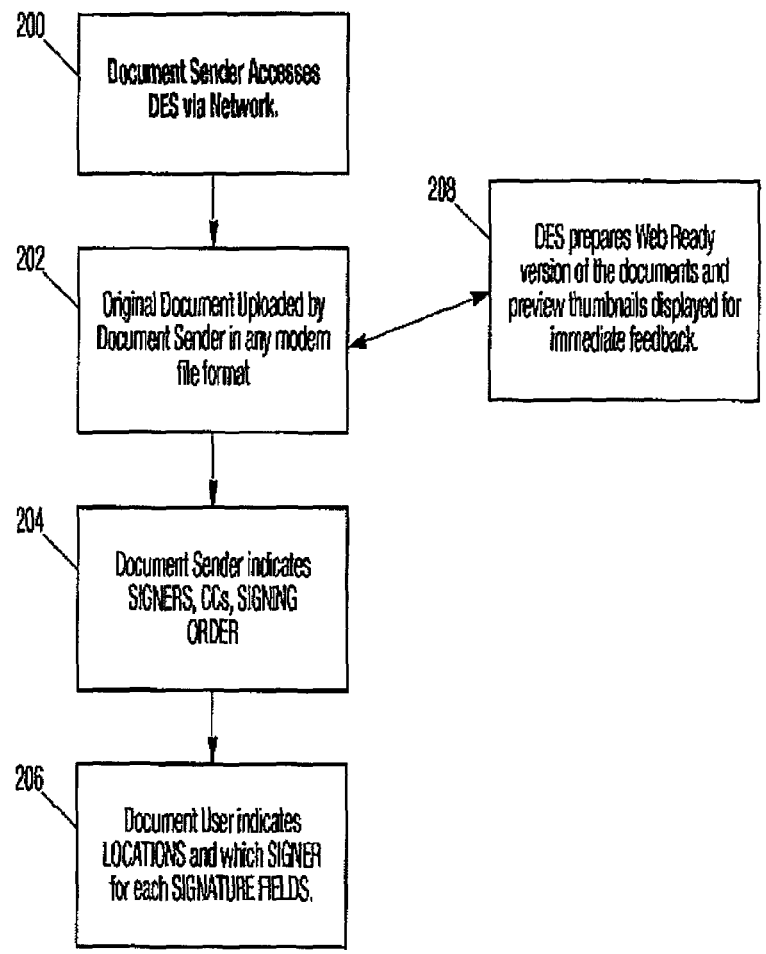
FIGS. 4A-4C are a flowchart of an embodiment of the present method.

The flowchart of FIG. 4A further illustrates an embodiment of the present method. As shown, a document sender accesses 200 the document execution server (DES) 102 via a network, such as the internet. The document sender then uploads 202 the original electronic document to the document execution server. The document sender then indicates at 204 the name and contact information of each signer user, each entity that will receive a copy of either the unsigned electronic document and/or the signed electronic document, and any order in which the signature fields contained in the subject document are to be completed by the designated signer users. The document sender also indicates 206 at this time, the locations of signature fields within the unsigned electronic document, together with instructions regarding which signer user is required to complete which corresponding signature field. With multiple signer users, different signer users generally are required to complete different signature fields, as well as different signature field types. For example, in a real estate transaction, the buyer may be required to provide a signature, a personal address, and a date, whereas an escrow agent may be required to provide a signature, a license number, and financial information.

As shown in FIG. 4A, in an embodiment, the document execution server prepares 208 a web-ready version of the original document. The document execution server also may generate thumbnail displays, flags, or other indicia, associated with the various signature fields for easier review by the signer user and a more expedient signer user completion of the designated signature fields.

Figure 4B:
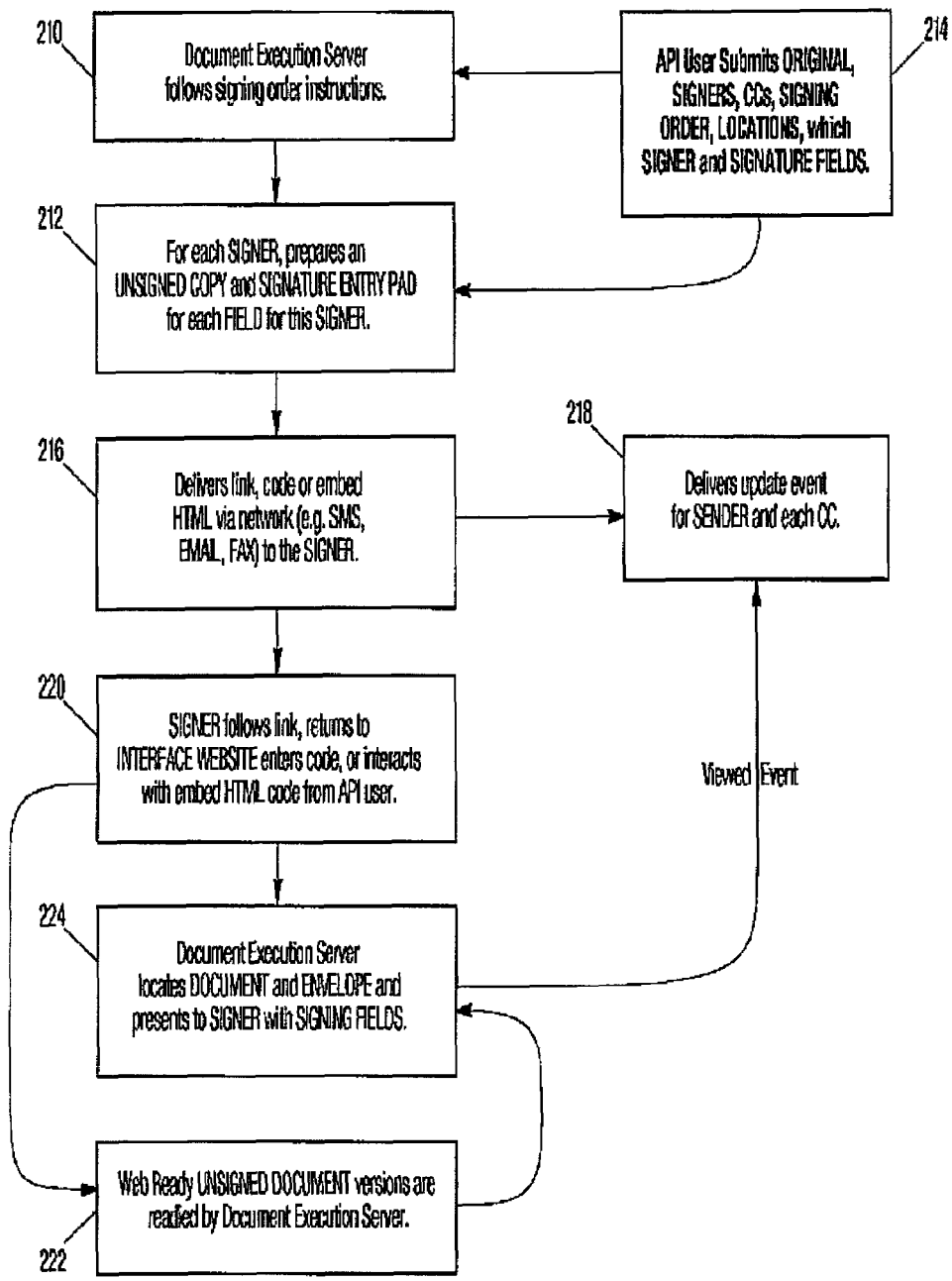

Turning to FIG. 4B, once the document execution server receives the original document, together with the additional document information from the document sender, the document execution server follows 210 the signing order instructions sent by the document sender. For each designated signer user, the document execution server in effect prepares 212 an unsigned electronic document associated with the original document, and a signature entry pad for each signature field. All such information regarding the signer user and instructions related to the document, are collectively referred to the "envelope" of the electronic document. Additional envelope information may include data associated with the identity of the signer user, such as email address, IP address, SMS address, facsimile number, or other electronic forms of address or identification. This envelope is integrally associated with the original document and, as such, remains part of the associated electronic and web-ready versions of the same document as such are generated by the document executive server.

In at least one embodiment, an API user, such as another internet-based device, is the document sender, which submits 214 the original document, and the associated signer user, copied users, signing order, signature field locations, and signature field authorizations to the document execution server. In an embodiment, the API user receives delivery of the unsigned web-ready documents on behalf of the designated signer users.

Once the unsigned electronic document is prepared, the document execution server delivers 216 an internet link, code, or embedded HTML via a network to the designated signer users. The network includes SMS, email, facsimile, and other available technologies for distributing data. At a proximal time the document execution server in effect transmits the unsigned electronic document to the signer users. The document execution server may deliver updates 218 of the event to the document sender and other designated entities to be copied on such transmission. In this manner, the document sender can begin to track the progress of the document as the designated signer users complete the signature events.

Once the link, code, embedded HTML, or other contact is made by the document execution server to a signer user, that signer user then accesses 220 the unsigned electronic document by following such link, returning to the website interface for the document execution server, interacts with the embedded HTML code from the API user, or otherwise opens the unsigned electronic document. The document execution server locates 224 the unsigned electronic document, together with its associated envelope information, and presents the same to each signer user.

In an embodiment, web ready unsigned document versions are readied at 222 by document execution server 102.

Figure 4C:
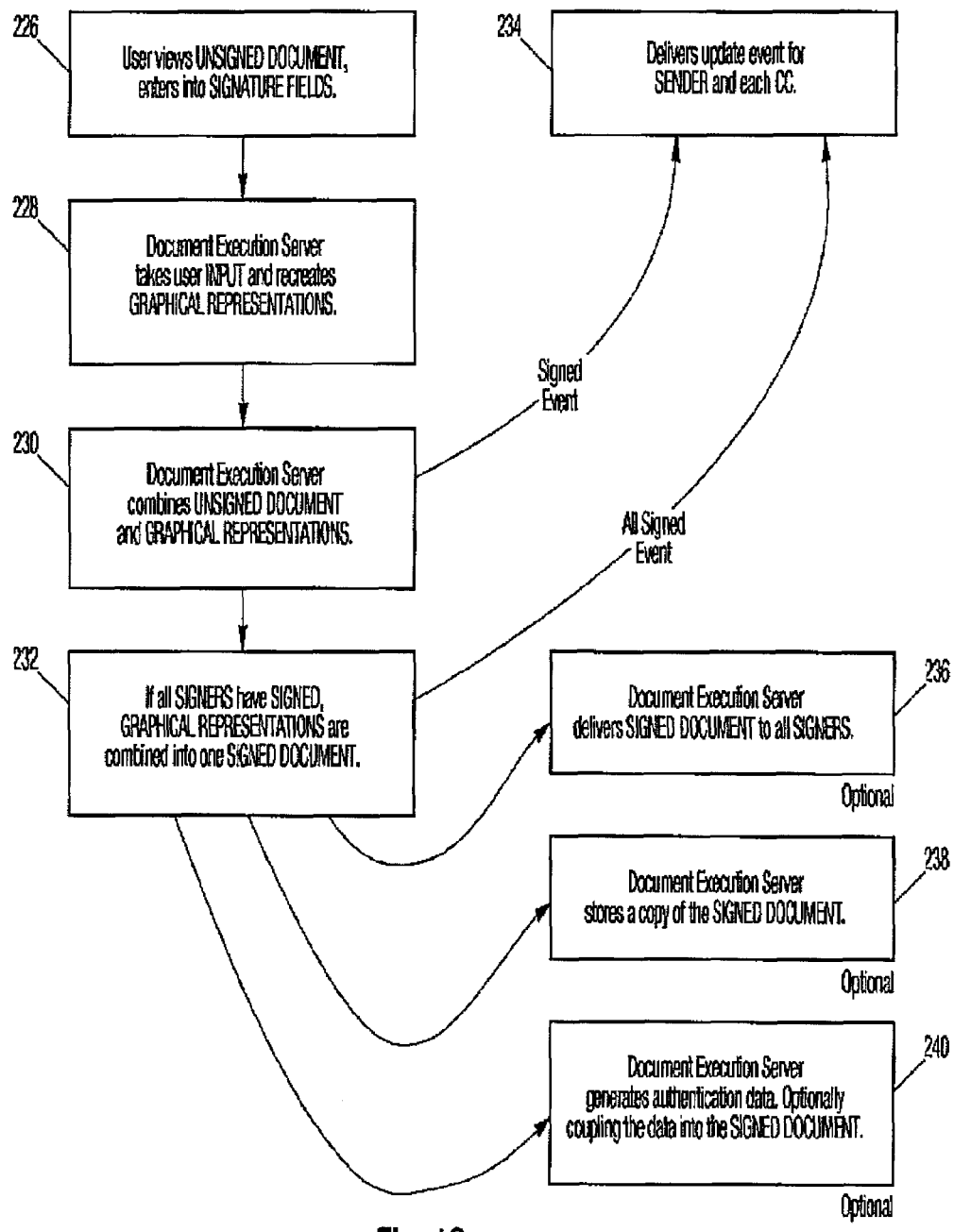

As continued in FIG. 4C, the signer user views 226 the unsigned electronic document, and enters the information requested in each of the signer user's respective signature fields. Information is entered into the signature field by the dynamic online signature entry pad associated with each signature field. Signature entry pads are dynamic fields that appear on the GUI to facilitate signer user entry of information required for the associated signature field. Such information may be entered using a touch pad, mouse, touch-screen, voice entry, and other technologies generally commercially available.

Upon receipt of the entered information, the document execution server creates 228 a graphical representation of the signature field input received from the signer user. The document execution server then (or at desired times) in effect combines 230 the graphical representations with the unsigned electronic document to generate a signed electronic document, to define a signed event. In parallel with receiving the signature field input from the signer users, and with generating each signed electronic document, the document execution server delivers 234 updates on the progress of the signing events to those entities identified as "cc", or copied entities, as well as to the document sender. Once all signers have completed signing the document, all graphical representations of all signature field input received from all signers is combined 232 into a single signed document.

In some embodiments, and as shown in FIG. 4C, the document execution server then delivers 236 a copy of the signed electronic document to each of the designated, or selected ones of the signer users associated with that document. In an embodiment, the document execution server optionally locks and stores 238 a copy of the signed electronic document, or may send a copy to a document and authentication data storage device for storage. In an embodiment, the document execution server generates 240 authentication data associated with the signed electronic document. Such authentication data may be data incorporated into the signed electronic document, it may be part of the document envelope, or may be some additional data used only for authentication purposes.

Figure 5:
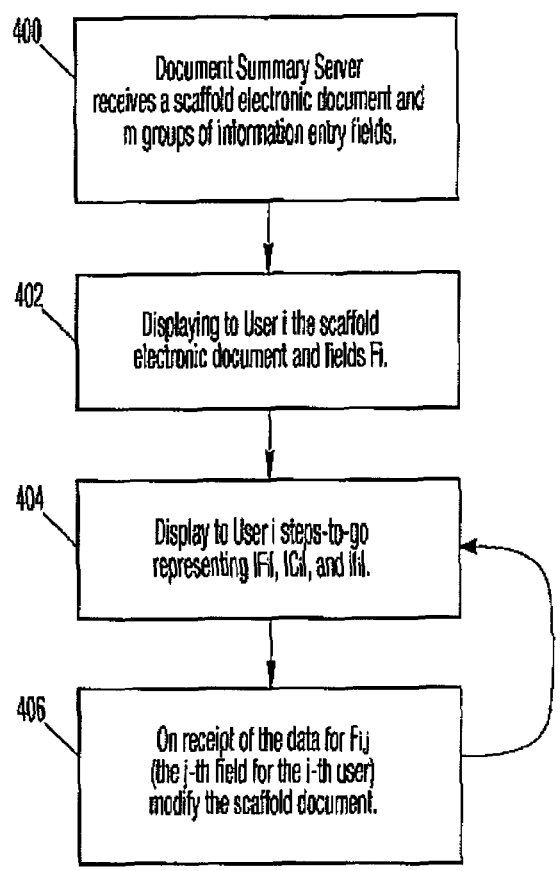
FIG. 5 is a flowchart of an embodiment of the present method.

In at least one embodiment of the present method in which a document summary server is used, and referring to FIG. 5, once the document summary server receives 400 a scaffold electronic document and m groups of information entry fields, the scaffold and fields $F_i$ then are displayed 402 to a user $U_i$. The display step includes displaying 404 a visual representation of steps-to-go, representing $|F_i|$, $|C_i|$, and $|I_i|$. Such visual representation may be permanent, dynamic representations, such as text, appearing at the top or side of the screens, or user-selective representations, such as text appearing in pull-down menus on the screen. In at least one embodiment, such visual representations may be in the form of dynamic graphical displays, such as a "thermometer"-type graphic, a numerical, button, or other graphic countdown display, color displays, such as red "buttons" representing incomplete information entry fields and green "buttons" representing completed information entry fields. On receipt 406 of data for $F_{i,j}$ (i.e., the $j^{th}$ field for the $i^{th}$ user), the user receives an updated display 404, with the steps-to-go indicator iteratively adjusted to reflect the number of information entry fields remaining to be completed and/or the number of information entry fields completed.

An example of an embodiment of the type described in the preceding paragraph updates progress indicators (i.e., indicators showing a user $U_i$ how many fields remain to be filled in) are updated in "real time." In this example, "real time" means the progress indicators comprise or consist of "front-end" code, wherein field data filled in by user $U_i$ is not transmitted to a server immediately, but rather is stored temporarily in a data store local to and accessible by the browser (i.e., the "front end") used by user $U_i$, and the progress indicators update in accordance with the temporarily stored data. After all required data fields are filled and the user $U_i$ clicks on a "submit" button in the browser, the browser submits all of the data field data from the local store to the server at once. In such embodiments, the phrase "on receipt of data" in step 406 refers to the receipt of data by the browser and the update of the "steps to go" indicator requires only the "front-end" code running in the user's browser.

Figure 6:
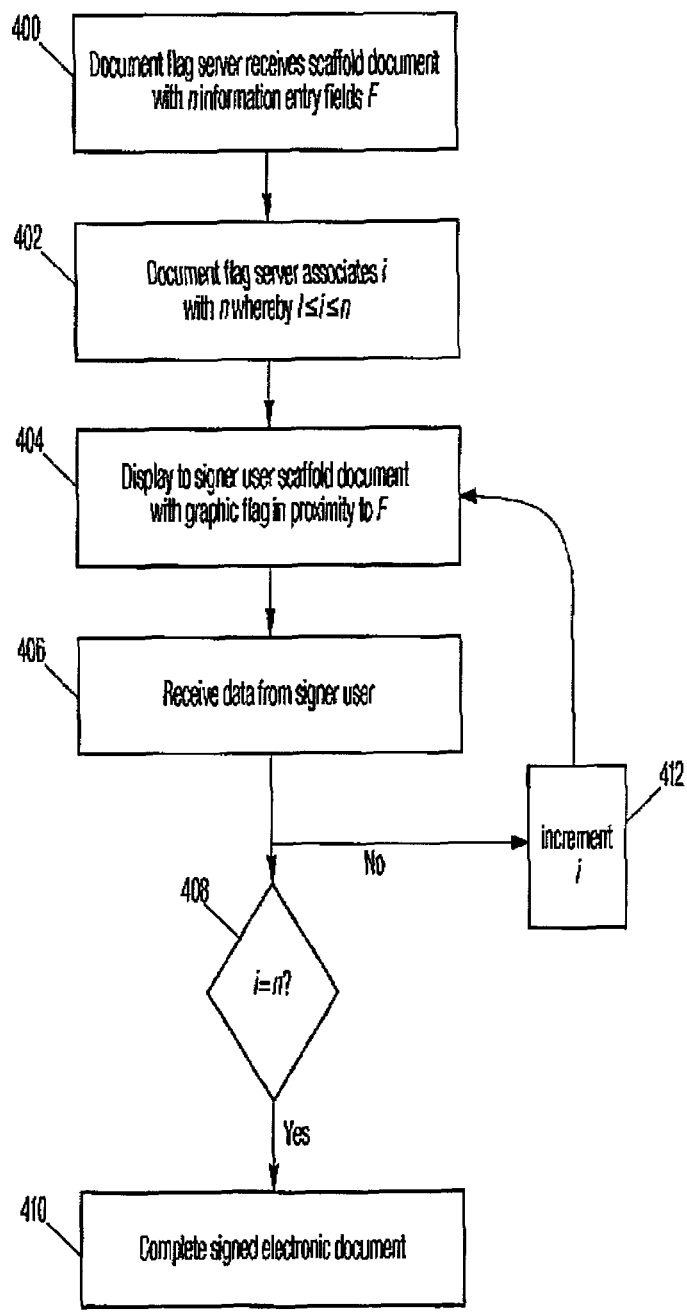
FIG. 6 is a flowchart of an embodiment of the present method.

FIG. 6 shows an embodiment of the present method in which flags are associated with information entry fields. As shown in that embodiment, the document flag server receives 400 a scaffold document having n information entry fields $F_1$ to $F_n$. The document flag server associates 402 an index value i with each information entry field in the scaffold electronic document. Index value i is set to equal the value 1, and the unsigned electronic document is displayed 404 to the signer user, which document includes a flag at F. Data then is received 406 from the signer user. If query 408 whether i=n is resolved in the positive, then the document will be treated as a signed electronic document and the process is complete 410. If query 408 is resolved in the negative, then i is incremented 412 and the unsigned electronic is displayed 404 again to the signer user, again with a flag associated with an information entry field $F_{i+1}$ until all information entry fields are presented to the signer user. In some embodiments of the present invention, information entry fields $F_1$ to $F_n$ include some fields that are designated as "optional" and thus, do not have to have data entered by one or more users $U_i$, or possibly any user $U_i$. Also, the submission of a "completed" document (which may include uncompleted optional information entry fields) need not be done automatically. Rather, in some embodiments, a designated information field such as the final field $F_n$ contains a "submit" button, either alone or in conjunction with a signature entry field, to cause the browser to send the completed document (with at least all of the mandatory information entry fields filled in) to a server.

In at least one embodiment, the flags 126 are successively located in the unsigned electronic document 112 with increasing index i, or are located in the unsigned electronic document 112 independent of the index i. In an embodiment, the flags 126 are located in the document based on an order predetermined by a document sender, or document envelope information provided by the document sender to the document execution server. In at least one embodiment, the flags are located in the document based on an order determined by a signer user or a third party.

FIG. 7A shows an example of a screen display in one embodiment having graphic flags 126 associated with a first user (user 1), $U_1$. The flags 126 are shown in the left margin, indicating that user 1 is required to make an entry in the information entry fields 122 (set off by square brackets) in the lines adjacent to the respective flags 126. In various embodiments, the flags 126 can be in the form of an arrow, an asterisk, or some other icon, and may be in indicative colors to make the flags readily identifiable by the signer user 120.

FIG. 7B shows an example of a screen display in one embodiment having flags 126 associated with a second user (user 2), $U_2$. The flags 126 in this FIG. 7B are similar to those in FIG. 7A, except that the flags 126 in this FIG. 7B indicate that user 2 is required to make an entry in the information entry fields 122 (set off by square brackets) in the lines adjacent to the respective flags 126.

In at least one embodiment, the flags 126 for $U_1$ and $U_2$ may all appear in the same document, where the flags associated with $U_1$ are a different color or shape than the flags 126 associated with $U_2$. In at least one embodiment, the flags 126 for $U_1$ and $U_2$ may be the same color, but the flags may be specific icons associated with the respective signer users.

In an embodiment having a document with multiple signature fields, the flags 126 may be dynamic, such that they move from signature field-to-signature field as the signer user 120 completes each field. In another embodiment, a page with multiple signature fields 130 may include several flags 126 indicating simultaneously all signature fields 130 on the page. Then, when a signer user 120 completes a signature field 130, the associated flag 126 disappears—all flags 126 disappear once all signature fields 130 in the unsigned electronic document 112 are completed by the signer user 120. In a scaffold document 118, the flags 126 may be different graphical colors or shapes to indicate different information entry fields 122. For example, flags associated with information entry fields requiring name data graphically appear as blue flags, flags associated with information entry fields requiring date data graphically appear as green flags, and the like.

Figure 8:
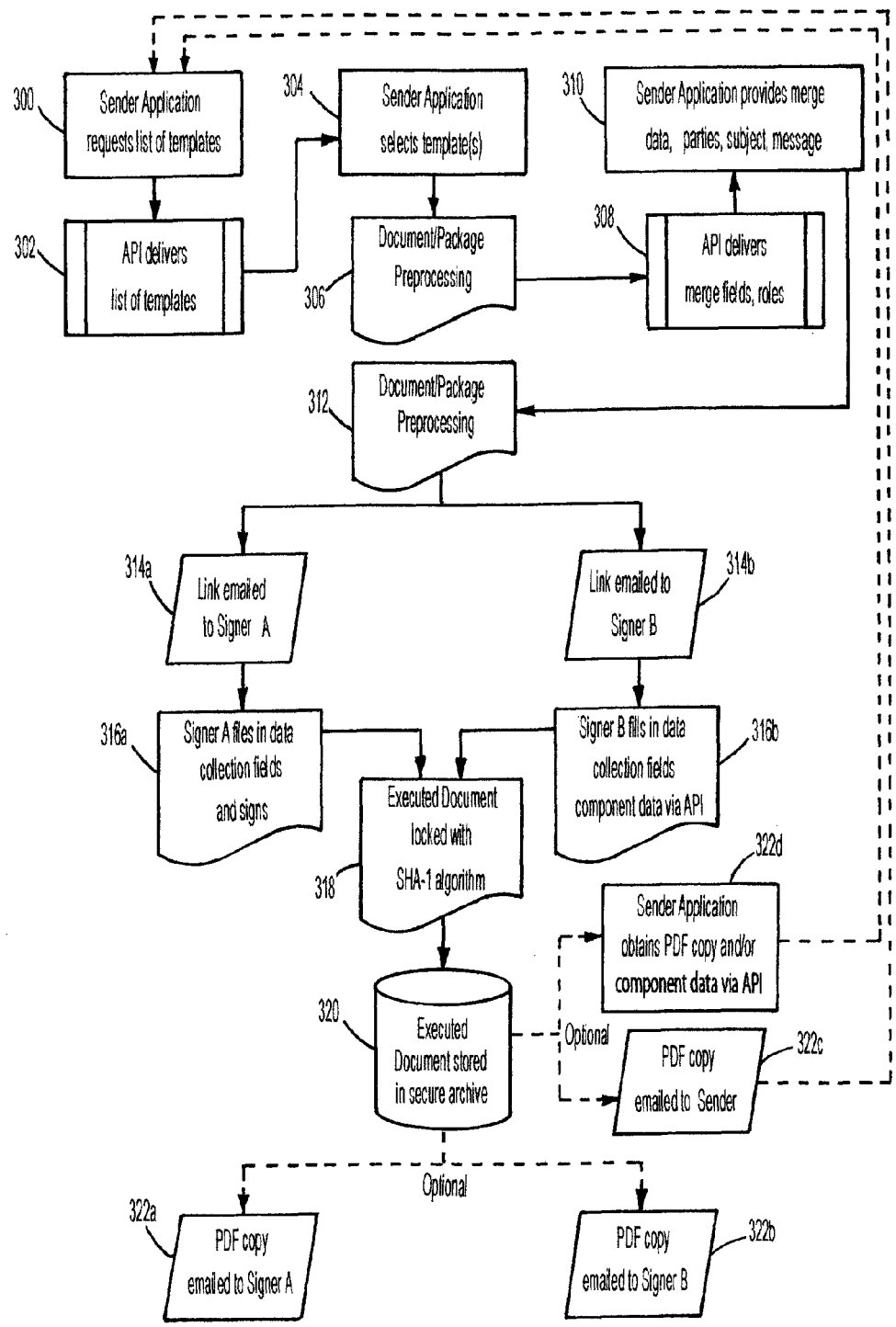
FIG. 8 is a flowchart of an embodiment of the present method.

In at least one example embodiment of the present method, the scaffold document 118 is one selected from predetermined template documents created by third party entities, or the administrator of the present method, and stored in the document execution server for use by customer/ document senders via API. In such an embodiment, as shown in FIG. 8, a document sender, or an application used by a document sender, requests 300 a list of template electronic documents. Such template documents have predetermined signature fields, which are not generally changed or changeable by the document sender. An example of such an embodiment would be form lease agreements, or other standard forms. In another example embodiment of the present invention, template documents are sent via a web user interface (UI) as opposed to an application programming interface (API). In yet another example embodiment, template documents can be sent either via a web user interface (UI) or by an application programming interface (API).

Upon receiving the request, the document execution server delivers 302 via API (or via UI), a list of available templates to the sender user. The sender user application selects 304 a template. Upon receipt of the sender user template choice 304, the document execution server performs document package pre-process 306. This pre-process generates a document ID associated with the template. It is possible that many document ID's are associated with each template, and each unique document (having an assigned unique document ID) likely will have a unique envelope. The API then delivers 308 the merge fields and roles associated with the envelope for the designated template. The sender user application provides 310 merge data, information relating to the signer users, and other information and data required for the designated template. In this example, the template is the unsigned electronic document identified and discussed above. The document execution server processes 312 the unsigned template document, in a manner similar to that described above, and sends links 314*a*, 314*b* via email to each designated signer user. Each designated signer user provides 316*a*, 316*b* the information required for each signature field. For signature fields designated as optional to one or more signer users by the sender user, the information may be left blank by the associated signer user(s). Upon receipt of all required signature field data (and whatever optional signature field data that may be entered), such data is incorporated into an unsigned template document, and the document execution server locks 318 the resulting signed electronic document, as described above in further detail.

At that point, the signed electronic document may be stored 320 in a document and authentication data storage device, and copies of the signed electronic document sent at 322*a* and 322*b* to the document sender at 322*c*, and others as designated by the document sender at 322*d*.

In some embodiments, sender users select a template unsigned electronic document from a website, from the user's own library, or from secondary sources. In at least one embodiment, the step of processing the document 312 is followed by an API (or UI) delivery of embedded signing codes. In at least one embodiment, all communications between the document sender and the document execution server, or between the document execution server and one or more of the designated signer users, is via email, facsimile, SMS, and other electronic communications methods generally available. As used herein, an "embedded signing code" is a code that is inserted into the HTML code of an existing third party webpage to display a document signing event (e.g., in an iFrame) inside the third party webpage. This type of code may be similar to, but not necessarily the same as, an embed code provided by YouTube®.

Figure 9:
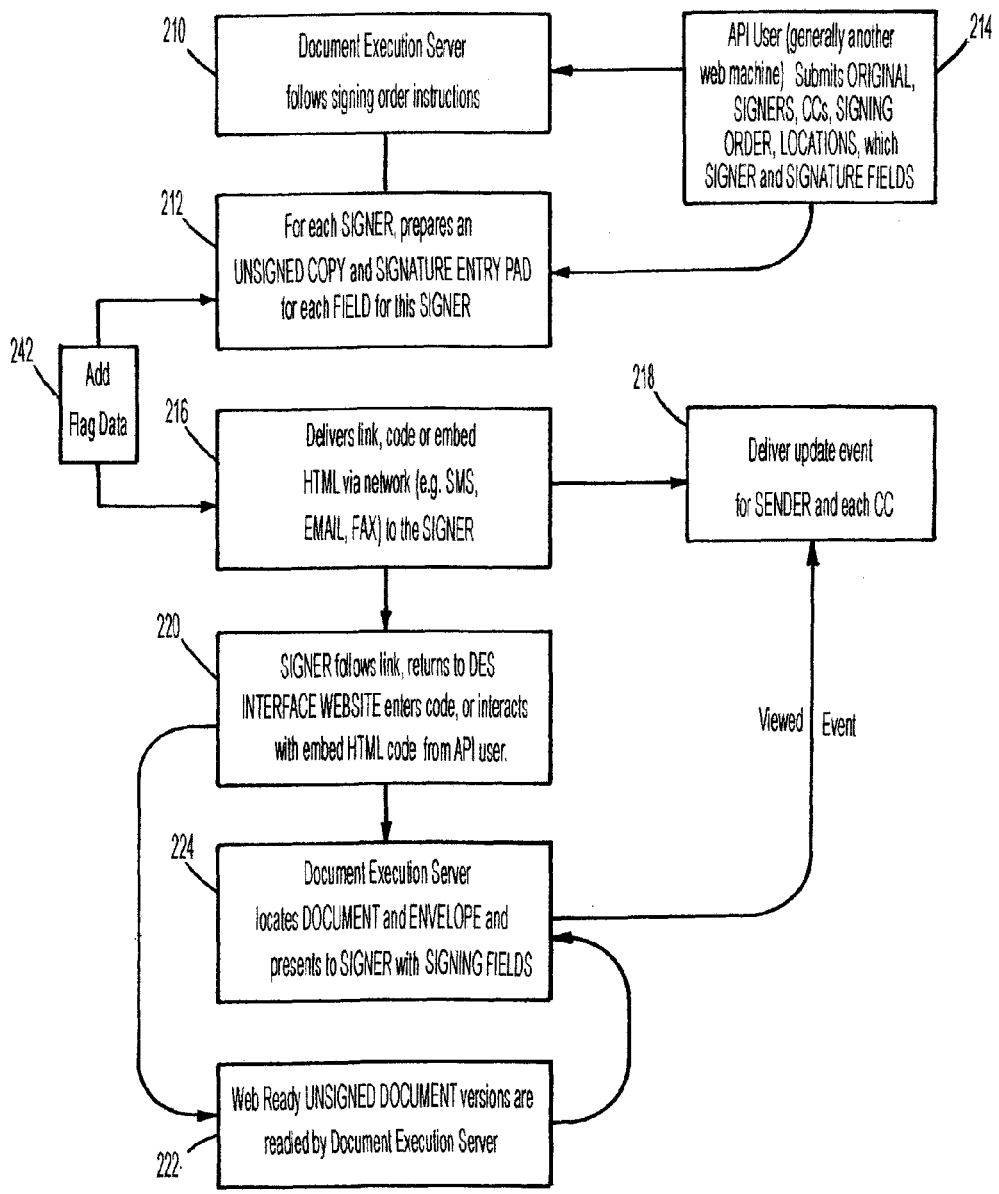
FIG. 9A is a flowchart of an embodiment of the present method.

In at least one embodiment, as shown in FIG. 9, the document execution server, prior to delivering 216 the unsigned electronic document to the signer user, modifies 242 the unsigned electronic document to include flag data to successively identify to each respective signer user the signature fields in that unsigned electronic document which required data entry. This flag data is removed in one example embodiment when the document execution server combines 230 the unsigned document and graphical representations of signature field data to create the signed electronic document.

Figure 10:
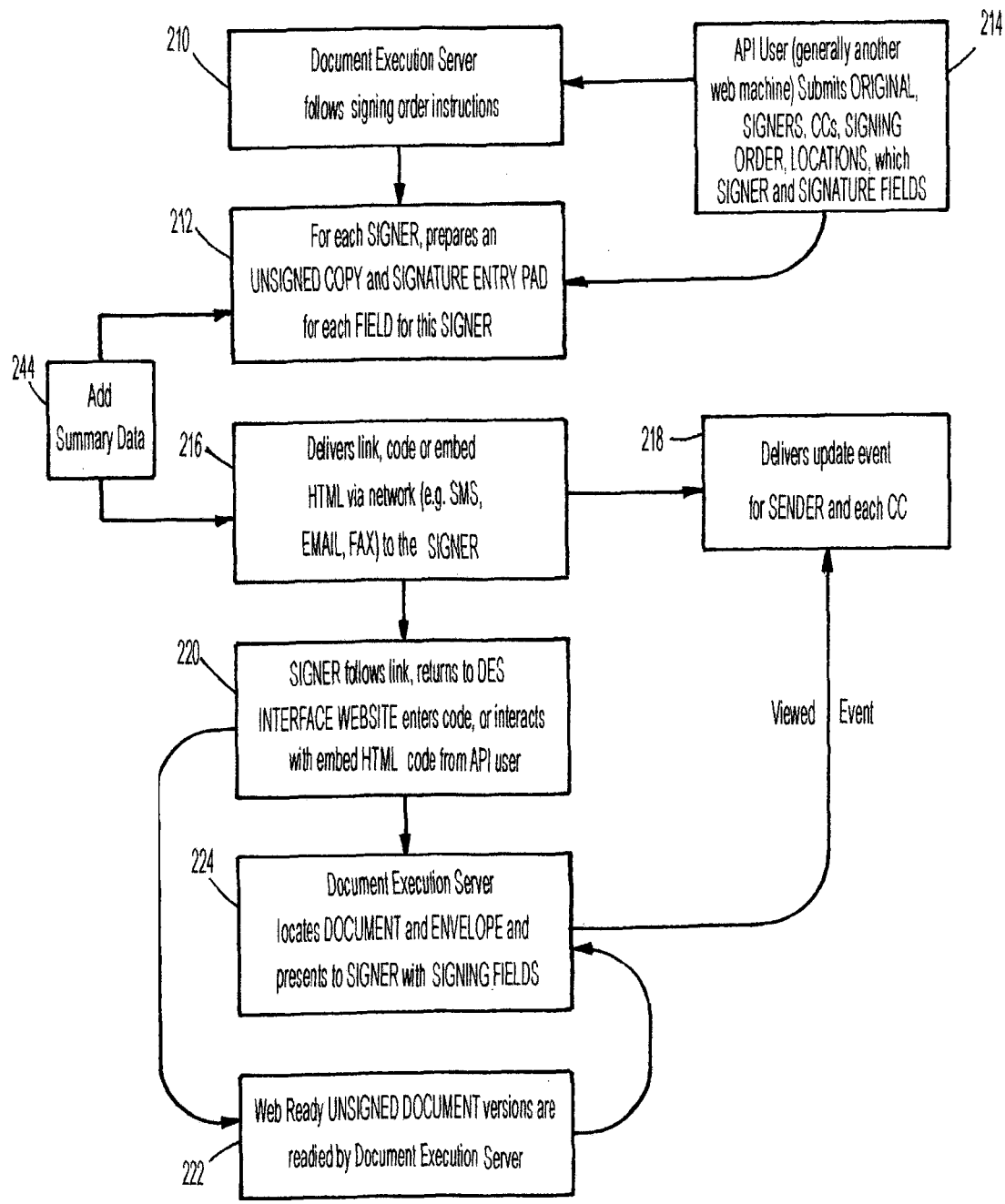
FIG. 10 is a flowchart of an embodiment of the present method.

In at least one embodiment, as shown in FIG. 10, the document execution server, prior to or contemporaneous with delivering 216 the unsigned electronic document to the signer user, modifies 244 the unsigned electronic document to include summary data, represented by an information summary indicator 124, associated with the document to assist signer users identify the locations of signature fields in the electronic document. Such information summary indicator 124 is presented in a side menu to the document, appears visually on the same page as a signature field, or is presented anywhere on the visual periphery of document pages. The information summary indicator includes such indicators as the total number of signature fields in the subject document, the number of signature fields that have been completed, the number of signature fields remaining to be completed, or any combination of such data. In at least one embodiment, the information summary indicator 124 is presented graphically as a bar, as buttons, as text, as color indicators (e.g., red for incomplete signature fields; green for completed signature fields), and the like. In an embodiment, the information summary indicator 124 is static, by presenting location identification data (e.g., page, paragraph information) associated with each signature field, or by presenting the total number of signature fields contained in the subject document. In at least one embodiment, the information summary indicator 124 is dynamic, changing as the signer user completes each signature field. In some embodiments, information summary indicator 124 is superimposed on the unsigned electronic document itself. For example, an entire page of a document may be color tinted to indicate the density of fields, or a colored vertical bar is imposed on one side of a page, e.g., the right side.

Figure 11A:
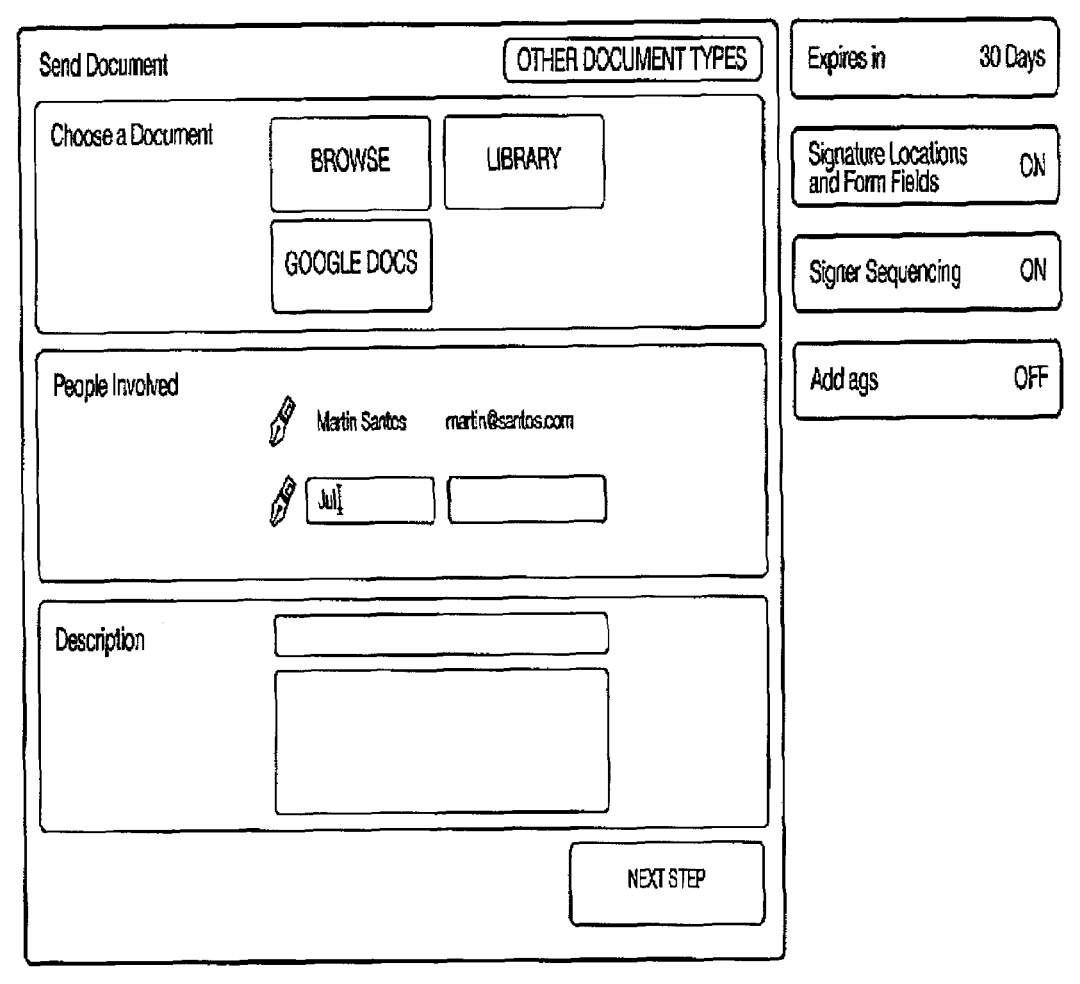
Figure 11B:
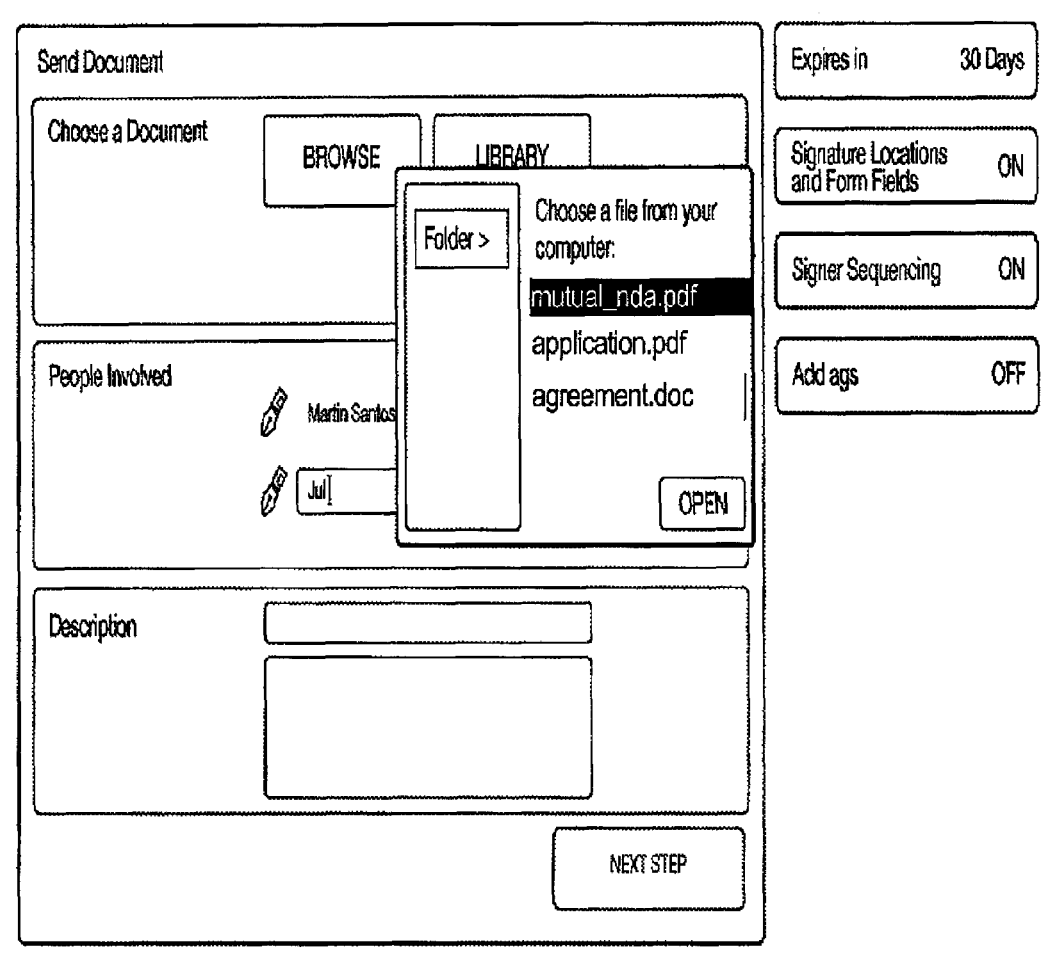
Figure 11D:
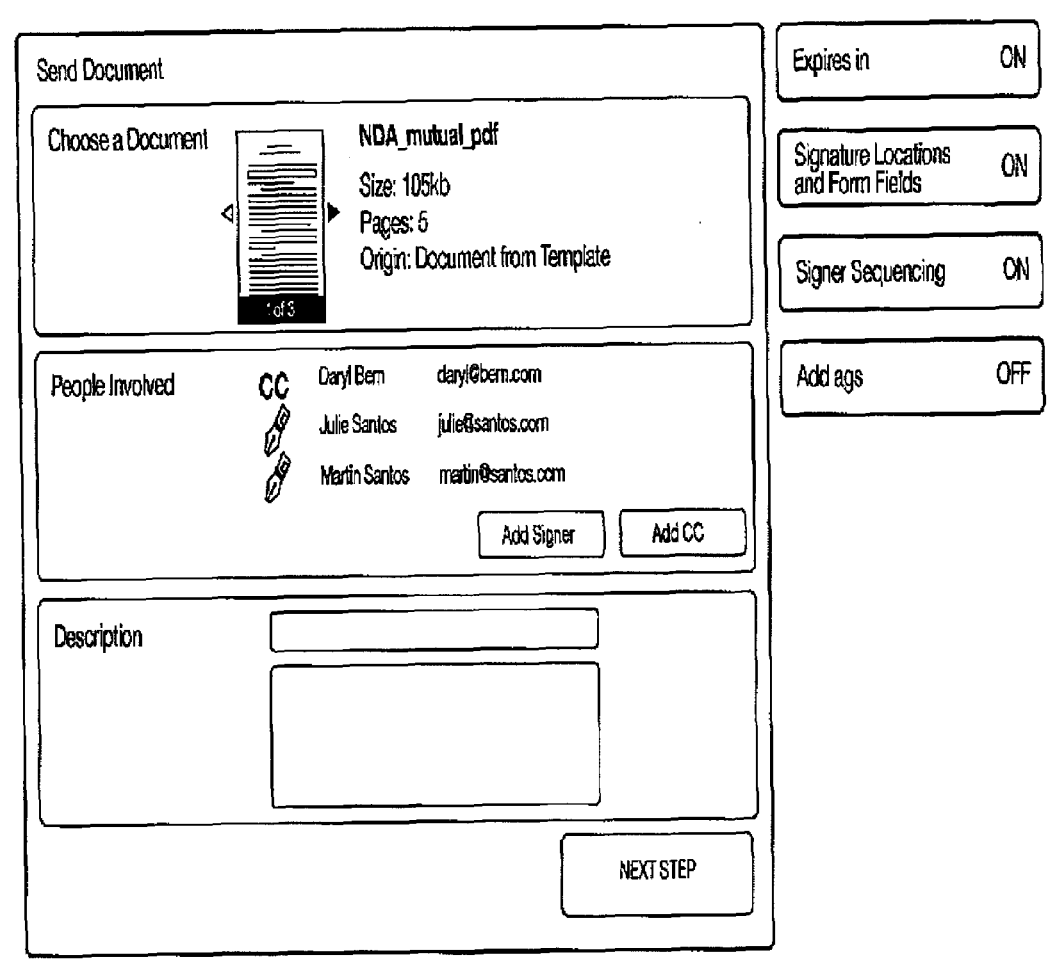
Figure 11E:

Turning now to FIGS. 11A-11M, this series of screen shots shows an exemplary embodiment of the present system and method. FIG. 11A shows a start-up/home screen for a website using the present system and method. Note that the sender user is prompted to "Choose a Document", name the "People Involved", (aka signer users), and enter a document "Description." In FIG. 11B, the sender user viewing this screen selects an "NDA" document from a selection of available template documents. The document sender may also import a self-generated document, or select a document from another source, as available.

FIG. 11C shows that a signer user has been selected, "Martin Santos", having an associated email address. The document sender may select from a library of contacts stored in association with the document sender's account information at the website, may manually enter the signer user contact information, or may otherwise import the information from a source. As shown, the document sender has the option of associating an expiration date with the selected document. This expiration date is that date on which a signer user no longer can complete the signature fields of a received unsigned document. In addition, although not shown in FIG. 11C, some embodiments of the present invention provide a counter indicating the number of signature locations and form fields that occur in the subject document. This counter may appear at one side of the screen, for example, the right side. The counter, among other things, allows the document sender in such embodiments to include flags, or "tags" in the subject document. In embodiments such as the one shown in FIG. 11C, there may instead be provided a button or option on the screen that a signer user uses to indicate whether he or she wants (or does not want) to "place" signature locations and/or form fields on the document on the next screen, i.e., an overlay screen. If he or she chooses not to do so, the embodiment skips the overlay screen and just sends the document signature locations and form fields.

In yet other embodiments, the uploaded document is parsed and a determination made of the number of signature locations and form fields, or that the uploaded PDF had already indicated signature locations and form fields. In the latter instance, the counter at one side of the screen may be presented in accordance with the determination.

Figure 11F:
Figure 11G:
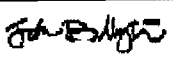

FIG. 11D shows a screen in which the document sender selected two signer users ("Martin Santos" and "Julie Santos"), and also selected a non-signer user to receive a copy of the document, including the signed document ("cc" "Daryl Bern"). FIG. 11E shows a document sender selecting a signature entry pad to insert, in the electronic document, a signature field. FIG. 11F shows the screen that allows the document sender to identify which signer user is associated with which signature field. The screen allows the document sender to indicate whether a signature is required or optional. Also, a field name is associated with a given signature field to describe the data captured in that particular field (for example, "Drivers License Number" or "Mother's Maiden Name") so that if a document sender exports the captured data into a database in the future, each piece of data has a description. FIG. 11G shows the signature entry pad associated with the signature field identified in the previous screen, located at the desired location within the document.

Figure 11H:
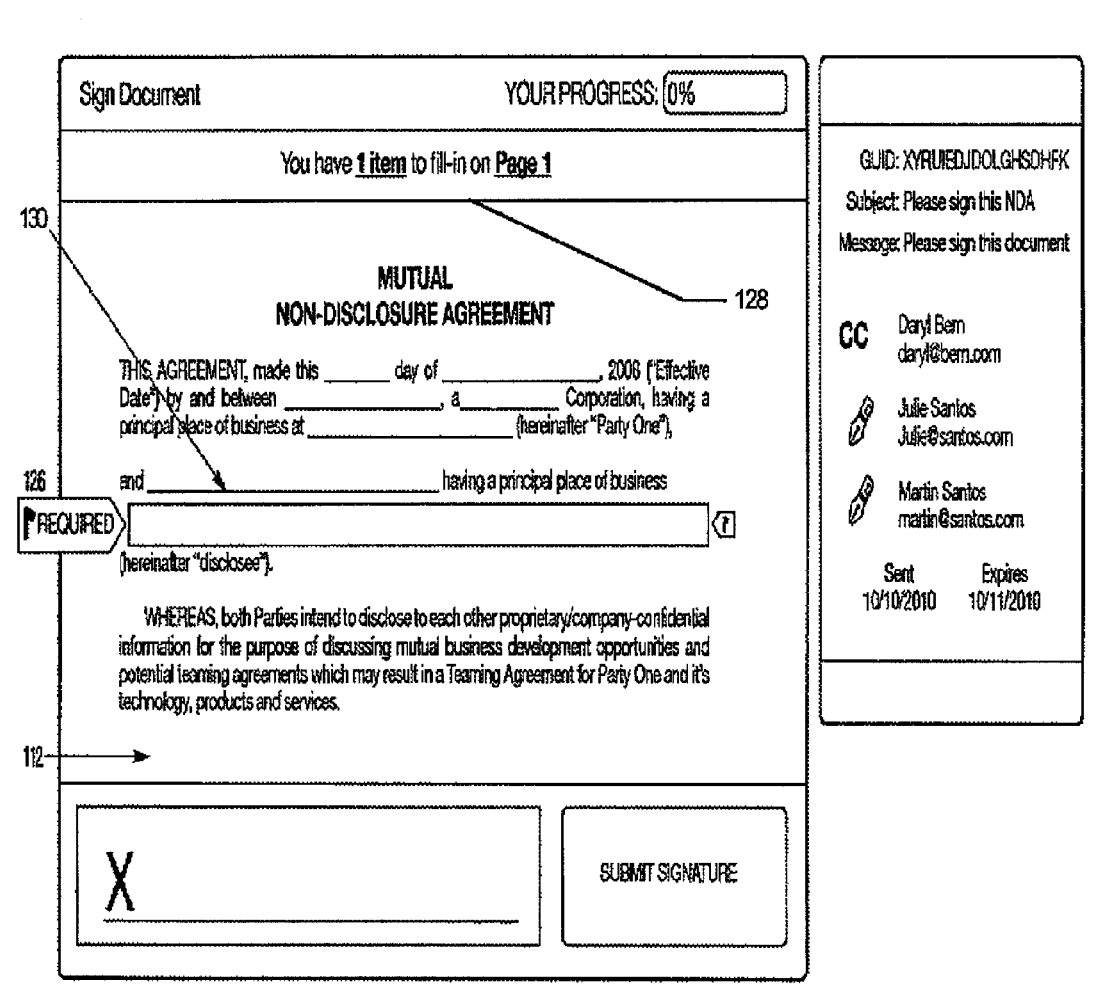

FIG. 11H shows a screen having a flag 126 to the left of a signature field 130 to be completed by a designated signer user, and summary text appearing at the top of the screen, indicating the number of signature fields to be completed in the document. At this point in the method, the screen is being displayed to a signer. The above steps are repeated iteratively until all desired signature fields and associated signature entry pads are defined and placed throughout the document.

Figure 11I:
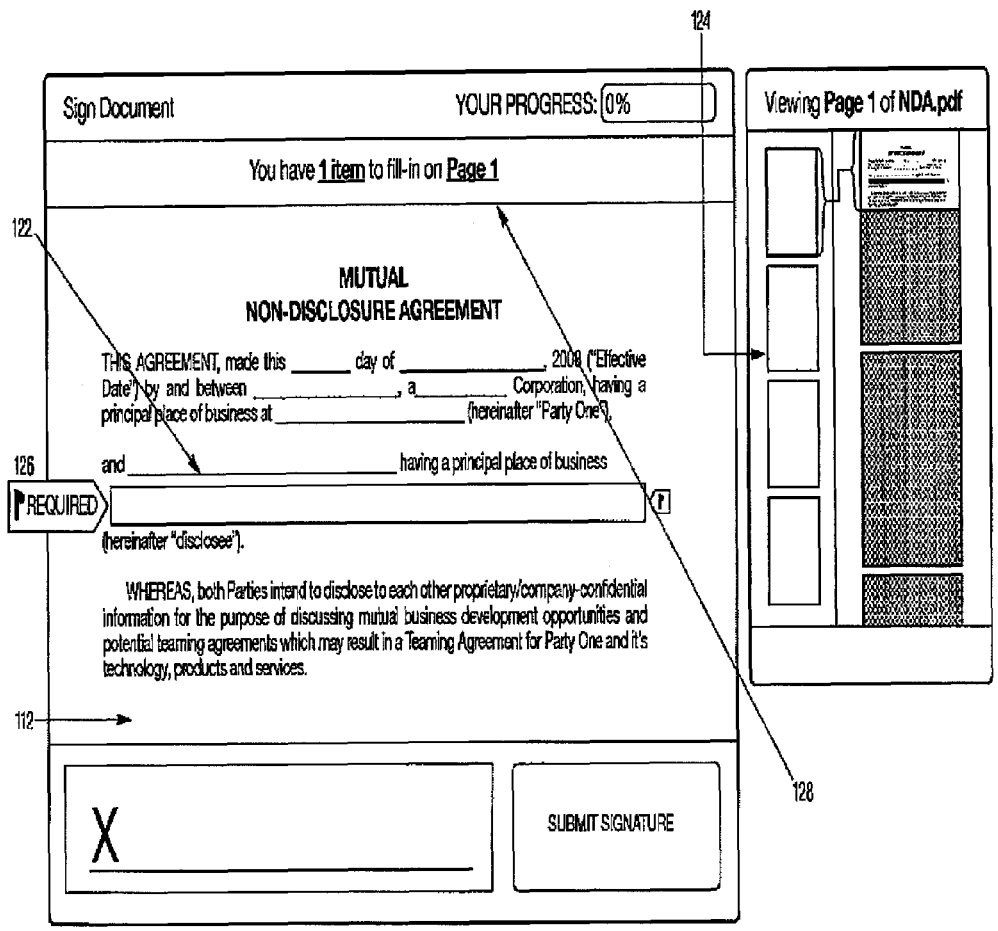
Figure 11J:
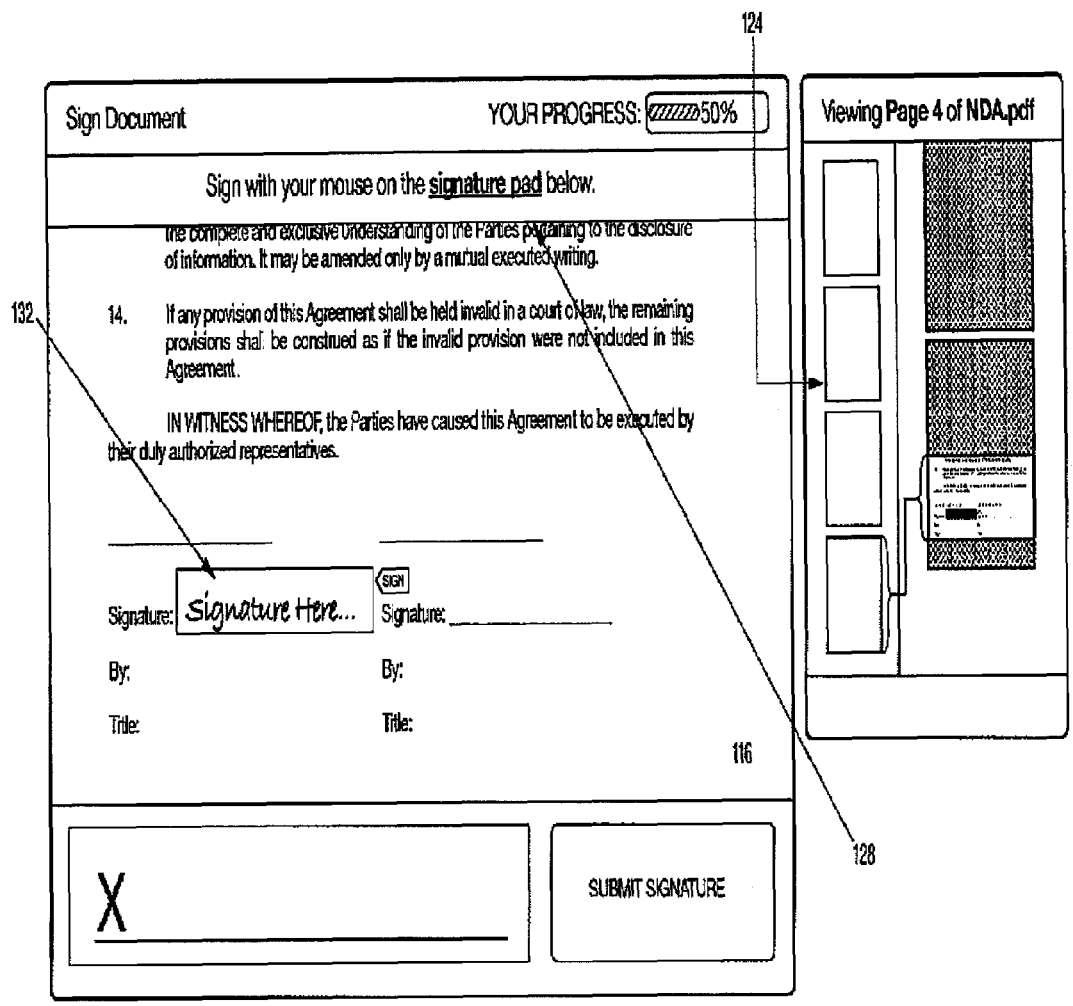

FIG. 11I shows a visual summary data indicator 124 that indicates certain information to the screen viewer about the subject unsigned electronic document 112 presented to a signer user. The visual may be in the form of a "thermometer-type" bar indicator (as shown), or any other visual quantitative indicator. The document summary server 108 collects information from each of the signer users regarding an unsigned electronic document. The collated information from the signer users is displayed on the information summary indicator 124 to indicate the level of completion of the signature fields within the target document. Note that at the top of the screen display for the document, are text instructions 128. These text instructions may function as an information summary indicator 124, as shown in FIG. 11I, or may be text instructions on what actions are required by the signer user, as shown in FIG. 11J. In some embodiments of the present invention, the information summary indicator 124 shows only the level of completion for the one signer viewing the screen, rather than the aggregated level of completion by all of the signers. In another embodiment, the aggregated level of completion is shown. In yet other embodiments, both the level of completion for one or more signers may be shown, along with an aggregated level of completion.

FIG. 11J shows how the signature field and associated signature entry pad 132 appears to the signer user once the scaffold document is completed and sent to the signer user. Note that the information summary indicator 124 changes to reflect that there remains one incomplete signature field in the document. In a color version of this embodiment, pages having incomplete signature fields may appear in one color, such as red, whereas pages on which all signature fields are complete may appear in another color, such as blue. The information summary indicator 124 may include both a dynamic element, as in the illustrated embodiment, wherein an indicator "slides" from the top to the bottom of a bar to indicate level of completion, and/or a color element.

Figure 11K:
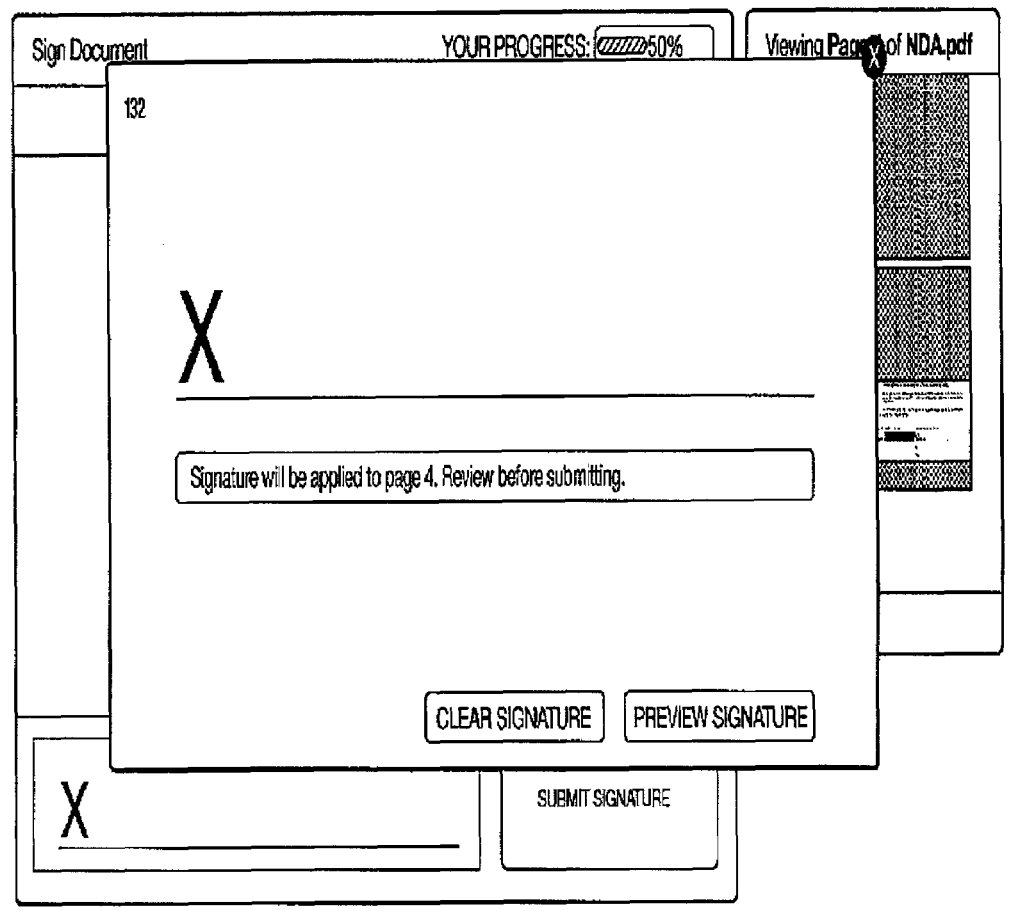
Figure 11L:
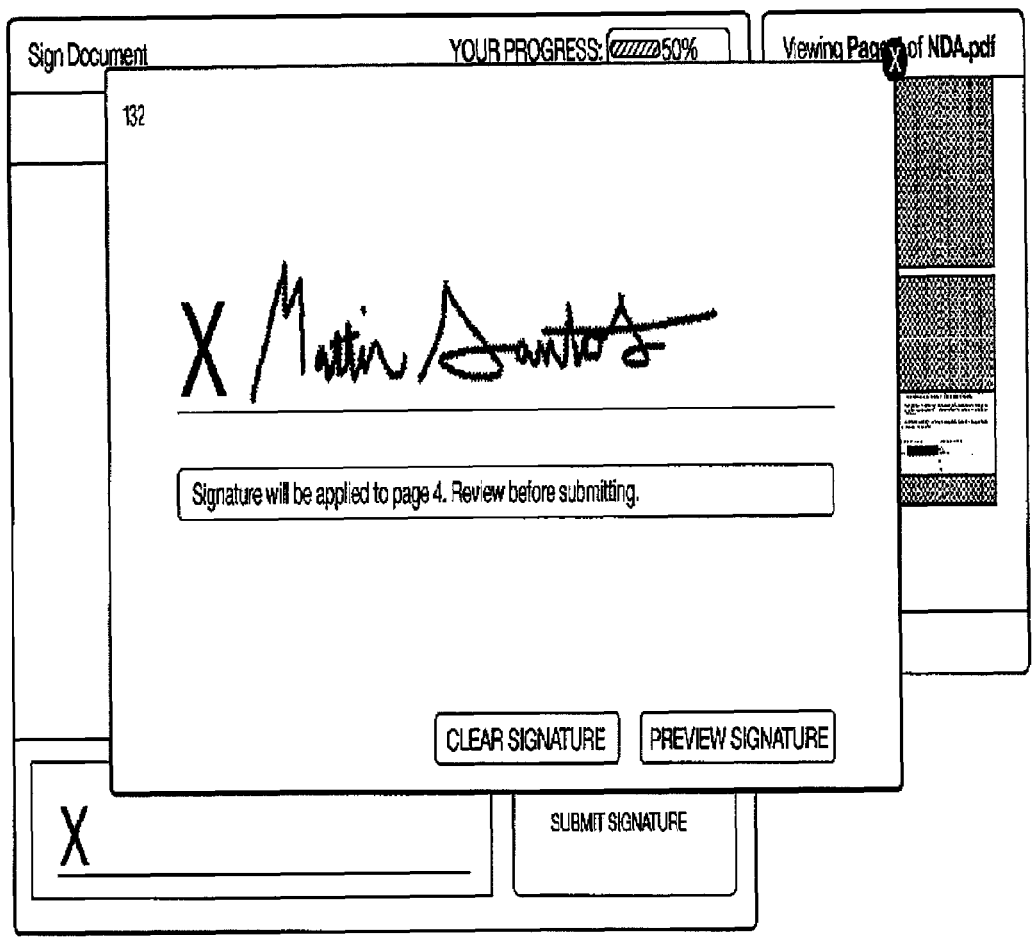
Figure 11M:
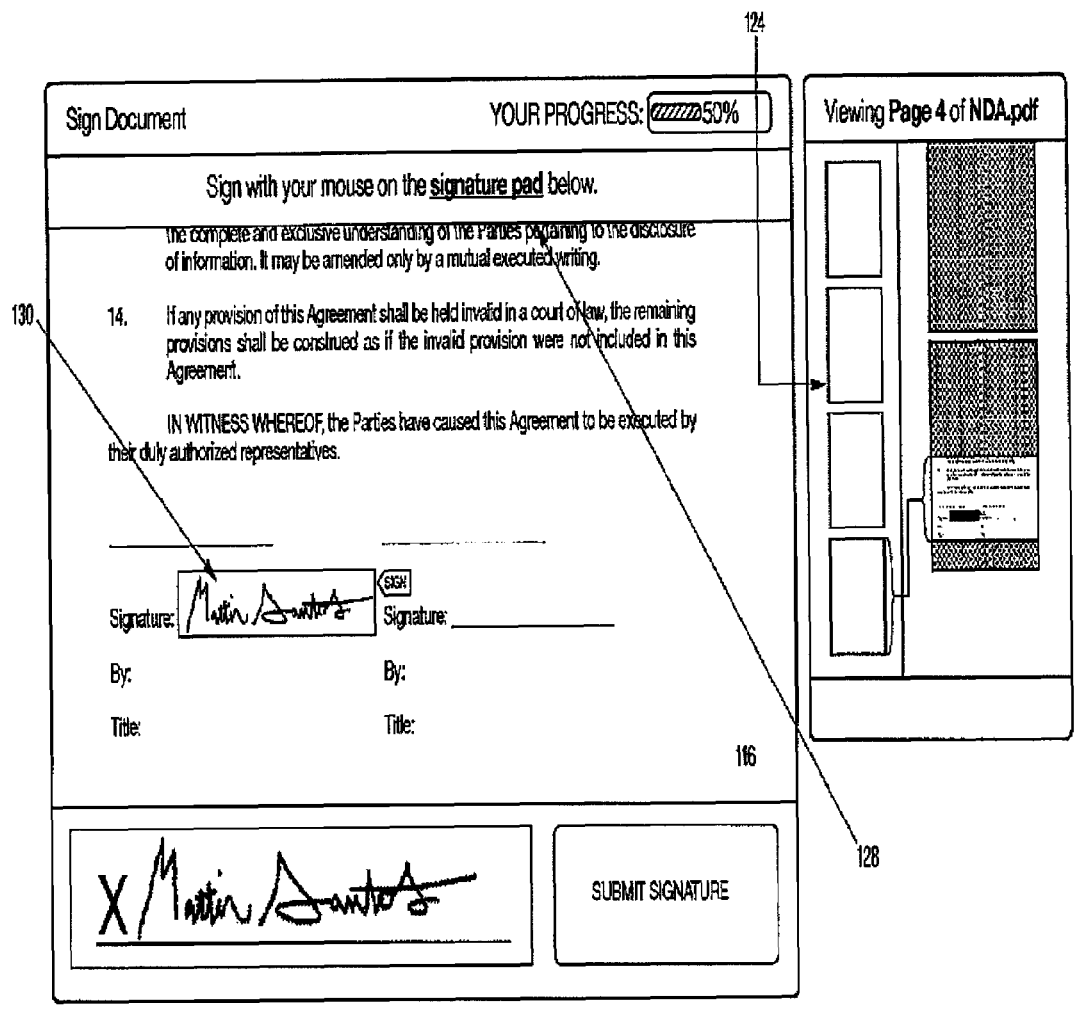

FIG. 11K is a close-up view of the signature field and associated signature entry pad 132, as shown in FIG. 11J. FIG. 11L shows the same signature field with a freehand signature included from a signer user. FIG. 11M shows a document with a signature in the signature field, prior to the signed document being submitted to the document execution server.

Although these screen shots show one implementation of the present method and system, there are many variations on the specific systems used, software programs and languages used, and layout and design used in implementing the present method and system within the scope of the claims.

The present methods and system can be practiced in a number of variations, including variations on workflow. In an embodiment, some information entry fields 122 are identified as being required to be completed, whereas other fields 122 are optional. In an embodiment, the workflow order is adjusted in accordance with the type of document to be completed, the number and nature of the signer users 120 involved, and other variations based on the preferences set by the document sender 110. In one such embodiment, the document sender 110 is a set workflow order requiring one signer user 120 to complete one or more information entry fields 122 before certain other identified signer users. The document summary server 108 may include workflow order restrictions for an unsigned electronic document 112 requiring iterative, serial actions. For example, a document sender 110 may instruct that signer user 1 $U_1$ complete information entry field 1 $F_{1,1}$, followed by the completion by signer user 2 $U_2$ of information entry field 2 $F_{2,1}$, before signer user 1 $U_i$ completes information entry field 2 $F_{1,2}$, and so forth until all information entry fields are complete.

In a more simplified embodiment, the document summary server assigns a workflow order that requires a first signer user $U_1$ complete all information entry fields F prior to the document being sent to another signer user $U_i$. In another embodiment, the document summary server 108 requires that each signer user complete the information entry fields in a predetermined order; for example, for signer user 1, $U_1$, $F_{1,1}$, THEN $F_{1,2}$, and the like.

At least one embodiment includes various forms of exclusivity. For example, information entry fields may be shared by one or more signer user, such that either signer user may complete one or more designated information entry fields. This may be done on a per-field basis, or for all fields in an entire document. In another embodiment, information entry fields are shared by one or more signer users, such that each signer user individually completes a designated information entry field, and the information provided by each such signer user is concatenated to complete a single information entry field.

At least one embodiment of the present apparatus and method includes variations on graphical updating of the summary data, represented by an information summary indicator 124. Also, in at least one embodiment, upon receipt of the $F_{i,j}$ data, the graphical representation of the information summary indicator 124 is updated immediately to the user $U_1$. Furthermore, in at least one embodiment, upon receipt of the $F_{i,j}$ data, the graphical representation of the information summary indicator 124 is NOT updated immediately to the user $U_1$. In at least one embodiment, upon receipt of the $F_{i,j}$ data, the graphical representation of the information summary indicator 124 is updated immediately for future users, i.e., $U_{i+1}$.

In at least one embodiment of the present system and method, one or more $F_{i,j}$ have default values that cannot be modified by a sender user. For example, "Date" information entry fields automatically fill with the current date. In at least one embodiment, at least one of the information entry fields have default values that can be modified by all or certain identified signer users. In at least one embodiment, some information entry fields may be filled using a merge function, and are thus denominated as "merge fields." These embodiments have merge fields that are filled in by the document sender before sending rather than the signer user. The data in the merge fields in these embodiments is merged into the document before the signer user sees it, and thus may be viewed as the sender "pre-filling" these fields before sending the document. In at least one embodiment, some multiple $F_{i,j}$ are completed by information input only one time by the signer user; for example, a single signature event then is automatically input simultaneously into potentially many $F_{i,j}$ identified either by a signer user, or the document sender.

Further, at least one embodiment includes displaying to each signer user 120 different types and amounts of information relating to a scaffold document 118. For example, the screen display of an unsigned electronic document 112 includes the total number information entry fields |F| and the number of complete information entry fields |C|, but not the total number of incomplete information entry fields for a specified document. In at least one embodiment, the screen display of an unsigned electronic document 112 includes the total number information entry fields $|F_{i,j}|$ and the number of incomplete information entry fields $|I_i|$, but not the total number of complete information entry fields |C| for a specified document.

In at least one embodiment, the screen displays the page numbers $P_{i,j}$ on which the next incomplete information entry field $I_{i,j}$ appears.

In at least one embodiment, the display for a display screen on which the scaffold document 118 or the unsigned electronic document 112 appear includes a conventional moveable window that is slidable over the display of the unsigned electronic document to make available for viewing only that portion of the document underlying the region of the window. At least one embodiment includes an actionable link $L_{i,j}$ that is displayed to bring the next information entry field to the viewport. In at least one embodiment, an actionable link $L_{i,j}$ is displayed for the incomplete required information entry fields $I_{i,j}$. In at least one embodiment, a visual indicator of the next incomplete required information entry fields $Z_{i,j}$ is displayed for incomplete required information entry fields $I_{i,j}$. In at least one embodiment, the visual indicator of the next incomplete required information entry field $Z_{i,j}$ is displayed for $I_{i,j}$, and includes an actionable link to bring the target information entry field into the viewport; for example, the visual indicator is an arrow on one side of the display screen, which arrow is clickable.

In addition, at least one embodiment includes various ways of displaying to one or more signer user what information is entered by one or more of the other signer users. For example, the information summary indicator may display to one signer user which information entry fields are completed by the other signer user, and which remain incomplete. In this embodiment, for example, the completed information entry field by one user $C_{i,j}$ appears as a green box on the unsigned electronic document displayed to a second signer user, whereas an incomplete information entry field by one user $I_{i,j}$ is displayed as a red box on the unsigned electronic document displayed to the second user.

The various methods described above may be embodied in, and fully automated by, software code modules (in some cases, for example, front end browser code running in a browser) executed by one or more general purpose computers, tablet computers, and/or special purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data. The flow of data through a network as well as the division and separation of data, controlled access to the data by the various parties involved, and verification of data over a distributed and/or public or private network are considered distinguishing features of the present invention. However, these features are not necessarily present in whole or in part in every embodiment, nor are they considered the only distinguishing features.

Some embodiments of the present invention use an API to use a biometric device on a cell phone to take a fingerprint (or other personally identifiable, essentially non-changeable biometric data) of a user, and then, without actually accessing the private information so obtained in the application itself, compare it to the fingerprint that unlocked the phone. Such comparison may be performed either via an API or through the phone service provider or phone manufacturer. This comparison provides a greater level of assurance that a person signing a document is the same person who unlocked the cell phone rather than an imposter who simply has access to the singer's email account or other web account.

Note that in some embodiments of the method it is not required that an application ("app") running on a cell phone receive any information from the fingerprint reader itself. Some of these embodiments require only that there be a fingerprint storage and comparison function in the phone itself that can be invoked by an API to trigger the taking of another fingerprint. Some of the embodiments require only storage of the user's fingerprint at the phone service provider's server (e.g., either the phone company's or the phone manufacturer's server) and a comparison function that is performed at that server to ensure that the person using the app is the same as the one to whom the phone is registered. Of course, these embodiments are not mutually exclusive of one another—some methods provide a choice between these two different forms of authentication (which choice may not necessarily be that of a signer user), and some methods use both forms of authentication.

Thus, if a user is being coerced to login to a second device, this fact can be inferred from the presence of two currently valid authentications being held at document execution server 102. In this case, if the signer user 120 tries to sign or complete a document, that attempt can be detected and rejected until some other even occurs. Examples of the types of events that are used in the various embodiments include one or more of a forced logout at one of the two devices that are logged in, a notification message being sent to either device (or both devices) requesting that the signer user 120 log out and log back in, a rejection of the login at the second device, and a requirement for manual intervention by the signature and authentication escrow agent to reset the document execution server 102 to allow future logins.

Figure 12:
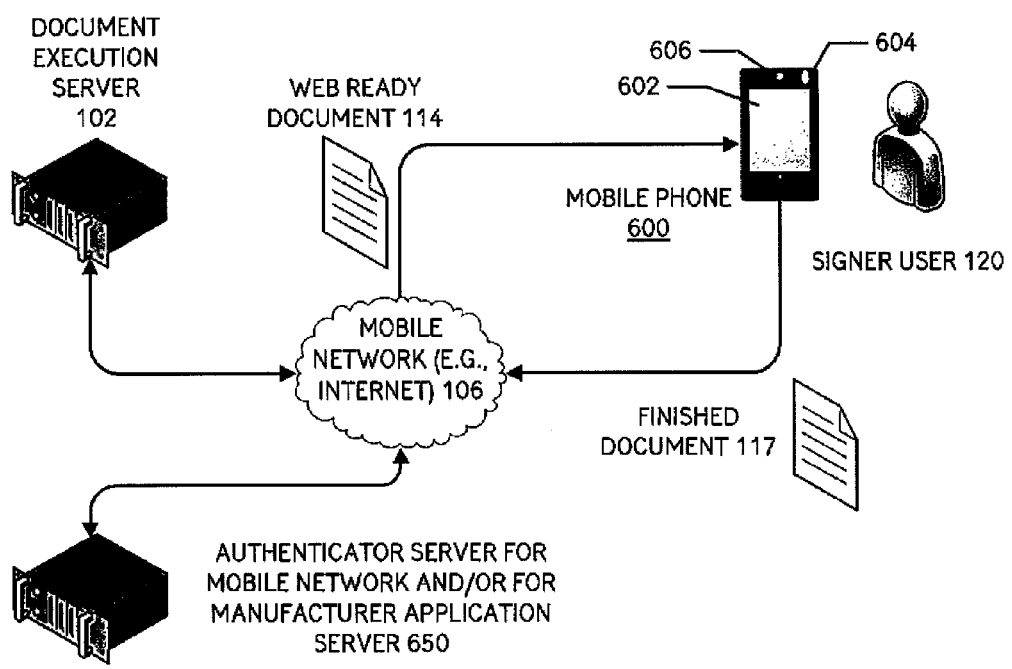
FIG. 12 is a pictorial block diagram representative of the communication of documents and authentication data in some embodiments of the present invention.

Thus, in some embodiments of the present invention and referring to FIG. 12, a mobile phone user unlocks his or her mobile phone 600 using a fingerprint sensor 604. (Without loss of generality, the term "mobile phone" 600 encompasses feature phones, smart phones, and tablet computers, for example). The data from fingerprint sensor 604 is sent to an authentication server 650 for mobile network 106 (which here refers to the wireless Internet and/or a mobile phone service supplier's own wireless network), where it is compared to baseline data for a mobile phone user registered to the phone manufacturer or phone user. If the fingerprint data matches that of a known user for the particular mobile phone or device 600, a signal is sent from authentication server 650 to mobile phone 600 to unlock it and make its features and apps (or at least a subset thereof) available. In some embodiments, mobile phone 600 also includes a camera 606. Also in some embodiments, authentication may require entry of a password or other indicia of ownership on a touchscreen 602. For some mobile phones or other devices 600, touchscreen 602 is replaced or supplemented by a separate display screen and a separate keyboard (not shown in the figures). In operation, document execution server 102 emails or otherwise sends a link to a web ready document 114 (or an unsigned and/or partially finished document) over the mobile network 106 to mobile phone 600. There, signer user 120 fills in, executes, and sends back the document as a finished document 117 (or a partially finished document) with additional authentication data via the mobile network 106 back to document execution server 102.

Figure 13:
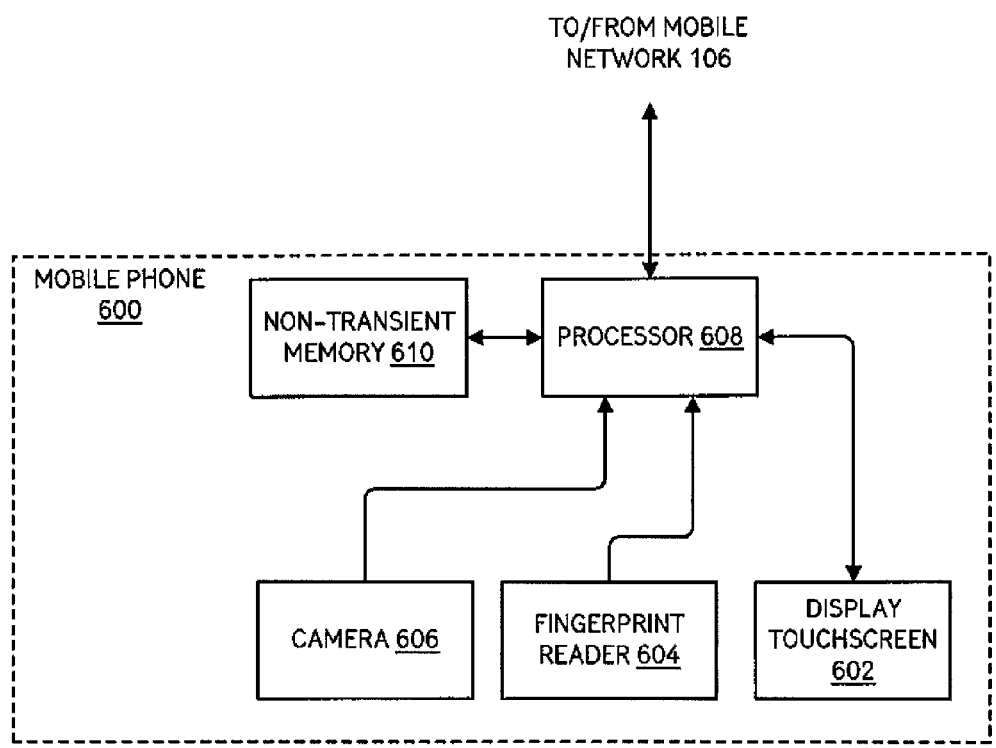
FIG. 13 is a block diagram representative of a mobile phone (or other mobile device) useful in some embodiments represented in FIG. 12.

In some embodiments of the present invention and referring to FIG. 13, mobile phone 600 (or another similar device, such as a table computer) comprises a touchscreen display 602 (or, equivalently, a display and one or more manual input devices such as a physical keyboard, a mouse, and/or a stylus and tablet, not shown separately in FIG. 13). Mobile phone 600 also comprises another biometric device such as a fingerprint reader 604, and, optionally, a camera 606. Mobile phone 600 also comprises a processor 608 that receives and processes data from and to touchscreen 602, from fingerprint reader 604, and camera 606, and/or the similar or equivalent devices mentioned above. (For the sake of brevity and without loss of generality, these equivalent devices will no longer be included in the description that follows.) Processor 608 may also be communicatively coupled to a non-transient memory 610 for storage of programs and/or data. Processor 608 is also communicatively coupled to send and receive data from network 106. An app or a web browser is used to request a link to a web-ready document 114 from document execution server 102. When the link is received, it can be followed by the app or web browser to display the web-ready document 114 on mobile phone 600 display screen 602.

A useful feature of some embodiments of the invention is the avoidance of the possibility that an imposter with access to an email account becoming qualified, on that basis alone, to sign (or in some cases, merely accessing) a web-ready document 114. Thus, in some embodiments, when web-ready document 114 is requested by mobile phone 600 via the app or web browser, document execution server 102 may or may not allow signer user 120 at mobile phone 600 to receive and/or sign it, depending upon how mobile phone 600 was accessed. Ordinarily, an IP address of mobile phone 600 can be obtained, but this address can vary because of dynamic IP address allocation and/or movement of mobile phone 600. Thus, one cannot usually tell from an IP address what any given device is, nor confirm whose device it is. One may be able to determine a browser type, but even when information as to the browser type is made available, it can be spoofed.

But many mobile phones 600 are already provided by their manufacturer with a built-in biometric hardware identification device. Information from one of these devices can either determine or assist in determining the actual identity of a signer user 120 that is trying to access a document, or at least help determine anonymously whether the signer user 120 is authorized to access and/or sign the document. Information obtained from the biometric device can also be combined with detecting the browser, getting a biometric signature, access to a particular email account, etc., for even greater security. Thus, in some embodiments of the present invention, one or more authentication factors are provided by a mobile phone 600 itself. Identity protection may be provided by obtaining confirmation of authentication from an authentication server for the mobile network and/or from a phone manufacture application server 650, thereby protecting signer user 120 from having sensitive data stored at the document execution server 102. This authentication can be accomplished without adding additional devices or "dongles" to mobile phone 600.

In this description and in the claims, unless otherwise explicitly stated, the term "document execution server" refers to a server operated by a document escrow service provider. An "application server for a mobile network and/or a manufacturer's application server" are operated by entities other than the document escrow service provider, unless otherwise explicitly stated. An "app provider" may be the document escrow service provider or a completely different party altogether operating with the permission of the document escrow servicer provider.

In some embodiments, an additional layer of security is added by allowing or requiring a signer user 120 take one or more pictures of himself. For example, some embodiments of the present invention provide a face recognition program that runs at, or in conjunction with, escrow provider's document execution server 102. An audit log is also provided in some embodiments. Some of these embodiments can be used with mobile phones 600 that do not have fingerprint readers 604 or biometric sensors other than one or more cameras. These embodiments include those that can be used with or without the cooperation of the carrier or phone manufacturer.

In some embodiments of the present invention, information reported back from a browser (or from an app) includes information from which what, if any, types of biometric ID may be available on the accessing mobile phone 600.

Almost all mobile phones 600 today have a camera, and people seem generally less adverse to sharing their pictures than other personal information, such as fingerprints. Any reluctance by the user to provide biometric authentication information may be overcome in embodiments of the present invention that provide one or more different views of a signer user's face to the escrow provider. Using this type of authentication may also circumvent a lack of cooperation of a phone carrier or manufacturer to provide further biometric authentication information.

Figure 14:
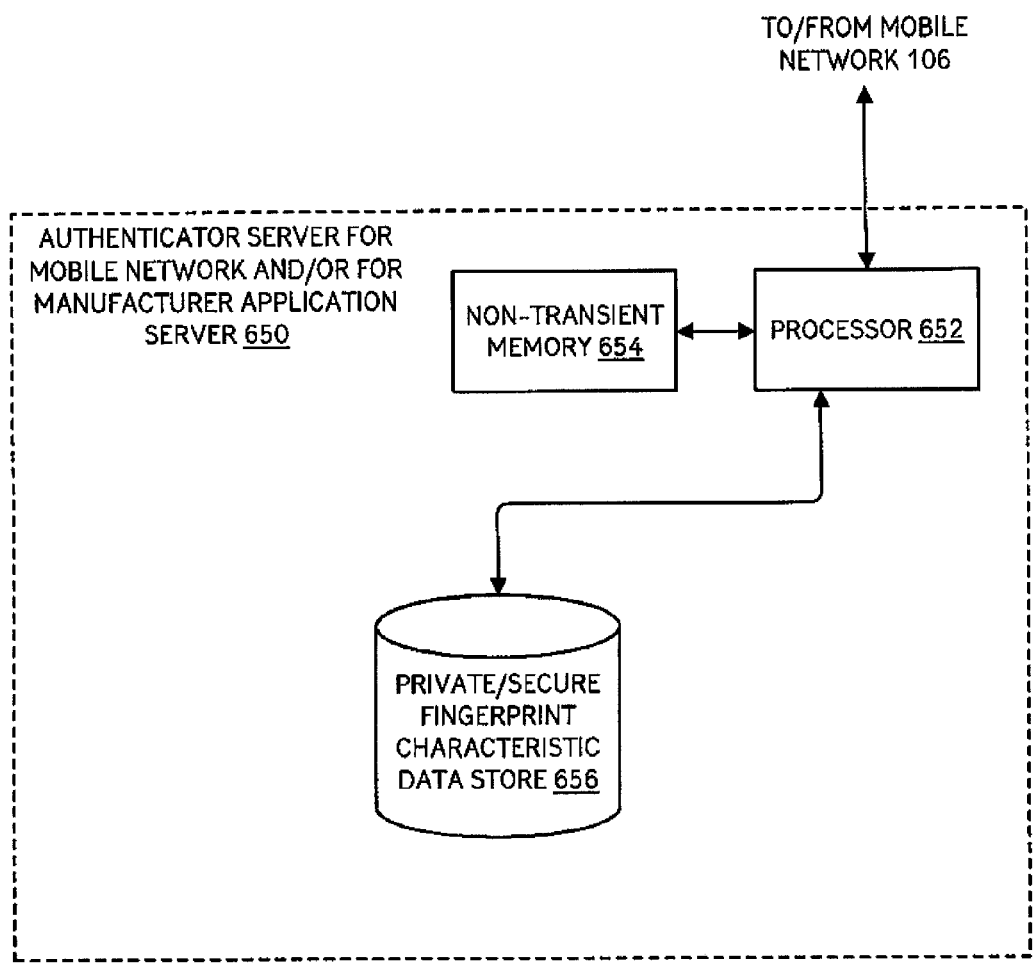
FIG. 14 is a block diagram representative of an authentication server for a mobile network and/or for a manufacturer application server useful in some embodiments represented in FIG. 12.
Figure 15:
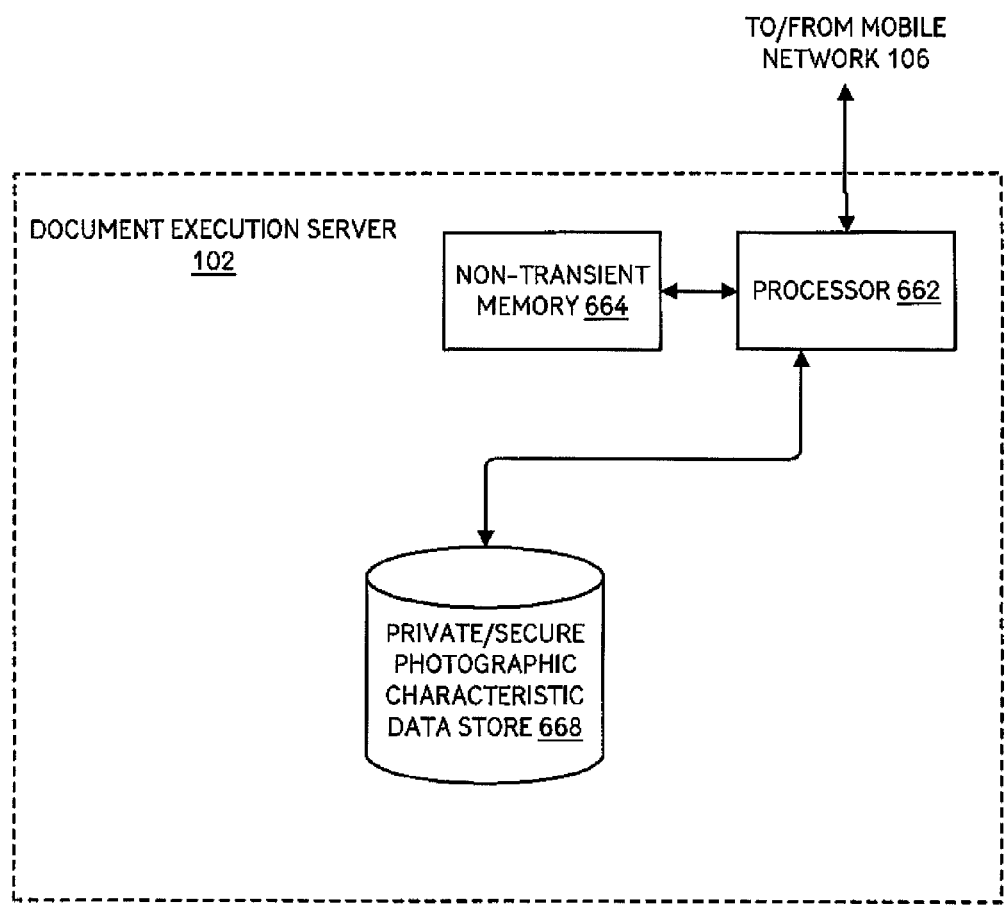
FIG. 15 is a block diagram representative of a document execution server useful in some embodiments represented in FIG. 12.

Thus, in some embodiments and referring to FIG. 14, an authentication server for a mobile network and/or for a manufacturer's application server 650 comprises a connection to and from a mobile network 106. Data passing to and from server 650 is analyzed by processor 652, which operates cooperatively with non-transient memory 654. Processor 652 also has access to a private/secure fingerprint characteristic data store 656, which is used by processor 652 to determine whether to allow a mobile phone 600 to access network 106 (e.g., by shutting down mobile phone 600 or at least its Internet or mobile data connection). Processor 652 and data store 656 are also used to re-authenticate signer users 106 for purposes of the present invention. In some of these embodiments, processor 652 is responsive to requests received from document execution server 102 over mobile network 106 to query fingerprint reader 604 on a mobile phone 600 and to send the results of the authentication to document execution server 102 instead of (or possibly in addition to) mobile phone 600. In another embodiment and referring now to FIG. 15, a photographic face recognition is provided by document execution server 102. In some of these embodiments, one or more pictures of signer user 120 are taken by camera 606 in mobile phone 600. Instructions may be given to signer user 120 as to which pictures to take and how to hold the mobile phone 600 so that camera 606 gets the correct views that are needed. Photographic data is received from mobile phone 600 via network 106. Processor 662 is responsive to this data with the aid of non-transient memory 664 to access a private/secure photographic characteristic data store 668. The photographic data is analyzed with the use of data store 668 to determine whether signer user 120 is authorized to access and/or sign a document using document execution server 102.

The data store 668 may also comprise a third party store, i.e. a social medium, such as Facebook, Instagram, and the like.

It will be understood that facial recognition data is used herein only as an example of the type of photographic data that can be biometrically analyzed. For example, instead of or in addition to photographic facial data, some embodiments of the present invention use photographs of the back of the hand or of the palm of the hand for analysis.

Some embodiments of the invention capture "baseline" data that is compared (or that already has been compared) to biometric or other data about the signer user 120. This comparison and/or the baseline data itself are stored with the document at document execution server 102 to serve as a heightened indication of the validity of the authentication of the user.

Figure 16:
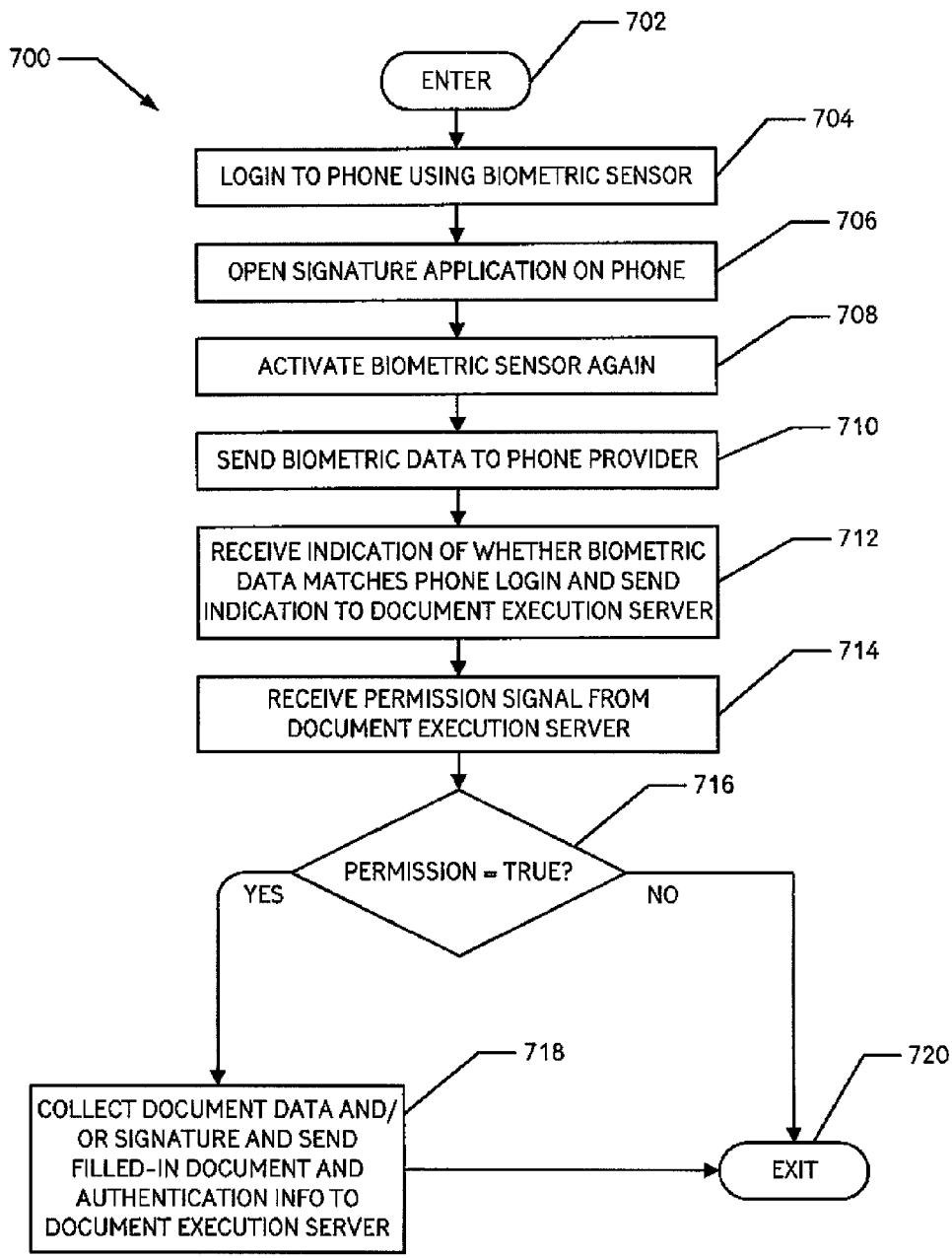
FIG. 16 is a flow chart representing a method embodiment of the present invention.

In some embodiments and referring now FIG. 16, a module 700 is entered at step 702. Module 700 is either executed by specialized hardware or by using the apparatuses illustrated in FIGS. 12-15. Depending upon the embodiment, a signer user 120 logs into a mobile phone 600 at step 704. A biometric sensor such as fingerprint reader 604 is activated to login at step 704. Mobile phone 600 sends the information via mobile network 106 from the biometric sensor to the authentication server for the mobile network and/or for the manufacturer 650, which determines whether to let the signer user 120 access the mobile network 106 via mobile phone 600. Thus, mobile phone 600 (or other mobile device 600) is logged into mobile network 106 at step 704.

After being logged in and permitted to access mobile network 106, signer user 120 opens a signature application that executes for example, using processor 608 and non-transient memory 610 of mobile phone 600 at step 706. At step 708, the biometric sensor is then activated again, this time under control of the signature application, and at step 710, the biometric data is sent to the same authentication server 650 that permits the mobile phone to log in. It should be noted that unless explicitly stated, the term "activated again" refers to readying the sensor and/or associated communication links out of the sensor so that sensor data is able to again be both read and used. The term "activated again" does not necessarily imply that the sensor, prior to being activated again, is literally turned off or has power removed from it.

It should be noted that the activation step 708 is optional to the extent that it may be continuously on or may be activated "on demand"

Examples of signature applications contemplated herein include web browsers as well as particular apps installed on mobile phones created for the purpose of cooperating with biometric sensors for biometric verification.

At step 712, an indication of whether the biometric data matches the telephone login is sent from the same authentication server 650 that permits the mobile phone 600 to log in to the document execution server 102. At step 714, document execution server 102 sends a signal to mobile phone 600 indicating whether mobile phone 600 has permission, based upon the biometric data sent at step 710, to access and/or sign a web-ready document 114.

If, at step 716, mobile phone 600 receives such permission, the mobile phone at step 718 collects document data so that it can access and/or have signer user 120 sign a web ready document 114. (Web ready document may be either a web ready document requested by the phone at a time prior to procedure entry step 702 or one requested during the execution of procedure 700). In case a signature is being supplied by signer user 120 via mobile phone 600, the filled-in or finished document 117 is sent to document execution server 102, and the procedure 700 exits at step 720, to be restarted at step 700 as necessary.

If, at step 716, mobile phone 600 does not receive permission from document execution server 102, procedure 700 exits at step 720 without uploading a finished document 117 to document execution server 102. However, in some embodiments, a web ready document 114 may be sent to mobile phone 600 for read-only purposes, depending upon the permission level placed on the web ready document 114 by its creator or allowed by the operator of document execution server 102.

Figure 17:
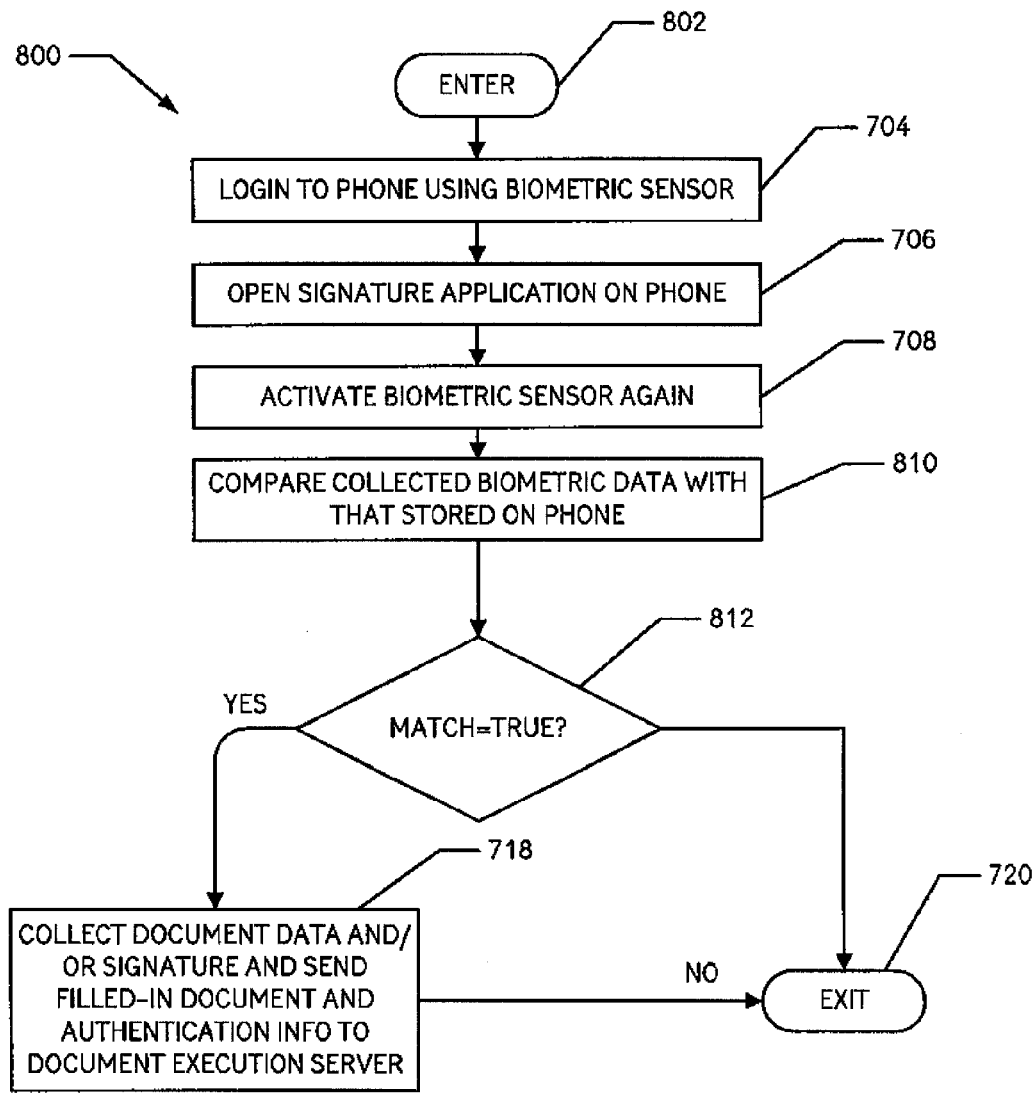
FIG. 17 is a flow chart representing yet another method embodiment of the present invention.

In some embodiments and referring now FIG. 17, a module 700 is entered at step 702. Module 700 is either executed by specialized hardware or by using the apparatuses illustrated in FIGS. 12-15 depending upon the embodiment, a signer user 120 logs into a mobile phone 600 at step 704. A biometric sensor such as fingerprint reader 604 is activated to login at step 704. Mobile phone 600 sends the information from the biometric sensor to the authentication server for the mobile network and/or for the manufacturer 650, which determines whether to let the signer user 120 access the mobile network 106 via mobile phone 600. After being logged in and permitted to access mobile network 106, signer user 120 opens a signature application that executes for example, using processor 608 and non-transient memory 610 of mobile phone 600 at step 706. At step 708, the biometric sensor is then activated again, this time under control of the signature application, and used to collect, e.g., fingerprint data from a signer user 120.

In the embodiment of FIG. 17, pre-recorded biometric data from one or more authorized signer users 120 is used to determine whether a signer user 120 is permitted to access and/or sign a web ready document 114. Thus, at step 810, biometric data collected at step 708 is compared with this pre-recorded biometric data. This comparison is done in some embodiments by transmitting from mobile phone 600 both the pre-recorded biometric data and the biometric data collected at step 708 to document execution server 102. Mobile phone 600 then receives an indication of a match from document execution server 102. In some embodiments, authentication server 650 is used in this step instead of document execution server 102, and in some embodiments, mobile phone 600 is, itself, used instead of either authentication server 650 and document execution server 102. In the latter embodiments in particular, it can be advantageous to store the pre-recorded biometric data at mobile phone 600 in a memory that is not easily changed by someone using mobile phone 600. For example, the pre-recorded biometric data could be burned into a ROM (read-only memory, not separately shown in the Figures, but part of non-transient memory 610).

At step 812, a match may be indicated either by mobile phone 600, itself, or document execution server 102 or authentication server 650 between the biometric data obtained at step 708 and the pre-recorded biometric data, mobile phone 600. If so, at step 718, mobile phone 600 collects document data so that it can access and/or have signer user 120 sign a web ready document 114. (Web ready document 114 may be either a web ready document requested by the phone at a time prior to procedure entry step 702 or one requested during the execution of procedure 700). In case a signature is being supplied by signer user 120 via mobile phone 600, the filled-in or finished document 117 is sent to document execution server 102, and the procedure 800 exits at step 820, to be restarted at step 800 as necessary.

If, at step 812, a match is not indicated to mobile phone 600, procedure 800 exits at step 720 without uploading a finished document 117 to document execution server 102, and the procedure is restarted at step 800 as necessary. In some embodiments, a web ready document 114 may be sent to mobile phone 600 for read-only purposes, depending upon the permission level placed on the web ready document 114 by its creator or allowed by the operator of document execution server 102.

Figure 18:
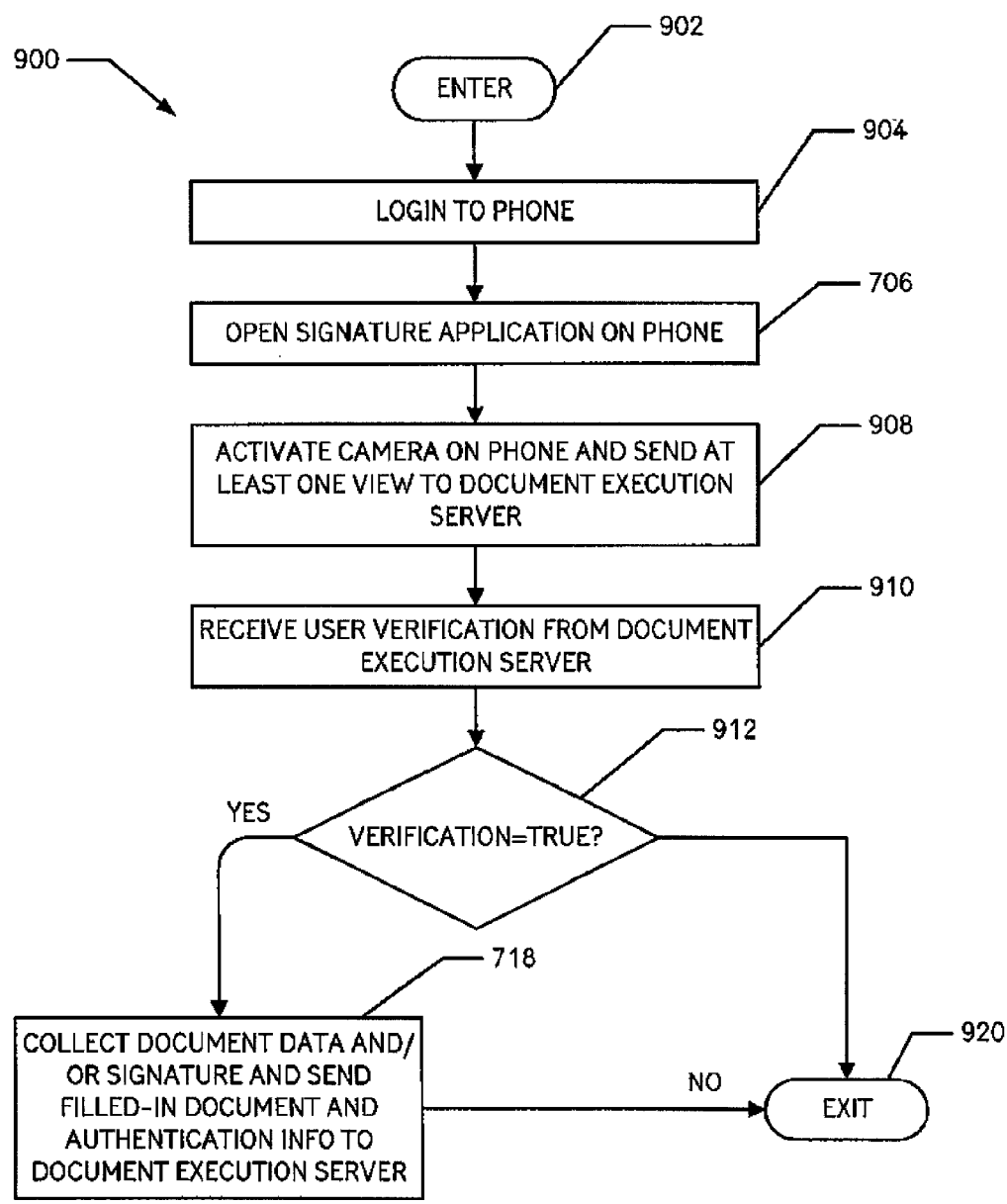
FIG. 18 is a flow chart representing yet another method embodiment of the present invention.

In some embodiments and referring to procedure 900 of FIG. 18, a module 900 is entered at step 902. Module 900 is either executed by specialized hardware or by using the apparatuses illustrated in FIGS. 12-15. Depending upon the embodiment, a signer user 120 logs into a mobile phone 600 at step 704. A biometric sensor such as fingerprint reader 604 is activated to login at step 704. Mobile phone 600 sends the information from the biometric sensor to the authentication server for the mobile network and/or for the manufacturer 650, which determines whether to let the signer user 120 access the mobile network 106 via mobile phone 600. After being logged in and permitted to access mobile network 106, signer user 120 opens a signature application that executes for example, using processor 608 and non-transient memory 610 of mobile phone 600 at step 706. At step 908, a camera 606 is activated on mobile phone 600, under control of the signature application, and used to collect at least one photograph of signer user 120. The photograph may be a picture of a hand or a view of a face, for example, or a combination of such pictures. Data representing this picture or these pictures is sent to document execution server 102 for authentication. At step 910, mobile phone 600 receives an indication of user verification of signer user 120 from document execution server 102.

At step 912, if the verification indicates a match, then at step 718, mobile phone 600 collects document data so that it can access and/or have signer user 120 sign a web ready document 114. (Web ready document 114 may be either a web ready document requested by the phone at a time prior to procedure entry step 702 or one requested during the execution of procedure 700). In case a signature is being supplied by signer user 120 via mobile phone 600, the filled-in or finished document 117 is sent to document execution server 102, and the procedure 900 exits at step 920, to be restarted at step 902 as necessary.

If, at step 912, a match is not indicated to mobile phone 600, procedure 900 exits at step 920 without uploading a finished document 117 to document execution server 102. The procedure is restarted at step 902 as necessary. In some embodiments, a web ready document 114 may be sent to mobile phone 600 for read-only purposes, depending upon the permission level placed on the web ready document 114 by its creator or allowed by the operator of document execution server 102.

The present invention also contemplates the signer user taking a picture of himself or herself and having its authenticity verified against a third party database prior to permitting the user signer to actually sign the document. The present invention also contemplates that even though the biometrics match to authenticate the signer user, that execution of the document is still prohibited by the web browser or application for other reasons, i.e. identity theft or the like.

While the invention has been described in terms of various specific embodiments, those skilled in the art will recognize that the invention can be practiced with various modifications within the spirit and scope of the invention. Also, embodiments which do not provide all of the benefits and features set forth herein are also considered within the scope of this invention, even though they include only some but not necessarily all of the features and methods described herein and are not specifically described herein. More particularly, various combinations of features described herein are all contemplated as being possible unless otherwise explicitly excluded or the features are physically impossible to combine. Upon gaining an understanding of the present invention by reference to this disclosure, one of ordinary skill in the art could select subsets and supersets of features disclosed herein to make additional embodiments that would thus be considered to be embodiments within the scope of the present invention.

What is claimed is:

1. A method for authenticating a user to a document escrow service, the method comprising the steps of:
   (a) logging a mobile device onto a mobile network, said mobile device being one of a mobile phone and a tablet computer and having a biometric sensor, a display, an input apparatus, and a non-transient memory in communication with a processor in said mobile device;
   (b) opening on the mobile device a signature application which allows a document to be signed;
   (c) reading the biometric sensor;
   (d) sending, via the mobile network, biometric data of the user collected from the reading of the biometric sensor via the mobile network to at least one member of an authentication group selected from the group consisting of a document execution server, a third party data base and a manufacturer application server;
   (e) receiving, at the mobile device, from said at least one member of the authentication group, a permission signal for indicating a match or a non-match between the biometric data collected from reading the biometric sensor on the mobile device and biometric data on the at least one member; and
   (f) depending upon the permission signal received, the signature application allowing the document to be signed and sent to the document execution server if there is a match or not allowing the document to be signed if there is no match,
   wherein the method further comprises, in response to the user opening a signature application on a second device while the signature application is open on the mobile device,
      reading a second-device biometric sensor in the second device;
      sending second-device biometric data of the user collected from reading the second-device biometric sensor in the second device to the at least one member; and
      receiving, by the mobile device, a rejection notification message generated in response to a detection of suspected coercion of the user and requesting that the user log out of and log back in on at least one of the signature application on the mobile device and the signature application on the second device,
      wherein the suspected coercion is inferred from a presence of two currently valid authentications being held at the document execution server.

2. A method in accordance with claim 1 wherein the biometric data is fingerprint data and the biometric sensor is a fingerprint sensor.

3. A method in accordance with claim 2 wherein said sending, via the mobile network, biometric data collected from said reading the biometric sensor to at least one member of the authentication group consisting of the document execution server, the third party data base and the manufacturer application server further comprises sending, via the mobile network, the fingerprint data to the manufacturer application server.

4. A method in accordance with claim 3 further comprising the signature application on the mobile device downloading a read-only version of the document even when the permission signal received indicates that the user of the mobile device is not authorized to sign and send the document to the document execution server.

5. A method in accordance with claim 1 wherein the at least one member is the manufacturer application server.

6. A method in accordance with claim 1 further comprising the signature application on the mobile device downloading a read-only version of the document even when the permission signal received indicates that the user of the mobile device is not authorized to sign and send the document to the document execution server.

7. The method of claim 1 wherein the at least one member of the authentication group is the document execution server.

8. The method of claim 1 wherein the at least one member of the authentication group is the third party data base.

9. The method of claim 1 further comprising:
   enabling the document execution server to reject the document after the signature application on the mobile device allows the document to be signed and sent to the document execution server.

10. A method in accordance with claim 1 wherein the biometric data is photographic data and the biometric sensor is a camera.

11. The method of claim 1 which further comprises:
    collecting a time stamp audit during at least one of steps (a) through (f), and attaching the at least one time stamp audit to the document.

12. The method of claim 1, further comprising, prior to reading the biometric sensor, performing an initial reading of the biometric sensor to authenticate the user of the mobile device, wherein logging the mobile device onto the mobile network is performed in response to a successful authentication of the user based on the initial reading of the biometric sensor.

13. The method of claim 1, further comprising, after receiving the rejection notification message, forcing a logout of at least one of the mobile device and the second device.

14. The method of claim 13, further comprising, after receiving the rejection notification message, receiving rejection notification messages in response to future login attempts until the document execution server has been reset.

15. The method of claim 14, wherein the biometric sensor includes a camera and wherein the biometric data of the user collected by reading the biometric sensor includes a photograph of one of (i) a back of a hand of the user and (ii) a palm of the hand of the user.

16. The method of claim 15, wherein the signature application on the mobile device includes a web browser, and wherein the method further includes providing to the at least one member of the authentication group, information that identifies what types of biometric identification are available for accessing on the mobile device.

17. The method of claim 1, further comprising, after receiving the rejection notification message, receiving rejection notification messages in response to future login attempts until the document execution server has been reset.

18. A method for authenticating a user to a document escrow service, the method comprising the steps of:
    (a) logging a mobile device onto a mobile network, said mobile device being one of a mobile phone and a tablet computer and having a biometric sensor, a display, an input apparatus, and a non-transient memory in communication with a processor in said mobile device;
    (b) opening a signature application on the mobile device;
    (c) reading the biometric sensor;
    (d) comparing biometric data of the user collected by reading the biometric sensor to biometric data previously stored in the mobile device to produce a permission signal, the permission signal configured to indicate one of (i) a successful comparison reflecting a match between the biometric data collected from the biometric sensor and the biometric data previously stored in the mobile device and (ii) an unsuccessful comparison reflecting no match between the biometric data collected from the biometric sensor and the biometric data previously stored in the mobile device;

(e) signaling the successful comparison to the signature application on the mobile device, and (f) dependent upon the successful comparison, the signature application on the mobile device allowing a document to be signed and sent to a document execution server via the mobile network, wherein the method further comprises, in response to the user opening a signature application on a second device while the signature application is open on the mobile device, reading a second-device biometric sensor in the second device;

sending second-device biometric data of the user collected from reading the second-device biometric sensor in the second device to the document execution server; and receiving, by the mobile device, a rejection notification message generated in response to a detection of suspected coercion of the user and requesting that the user log out of and log back in on at least one of the signature application on the mobile device and the signature application on the second device, wherein the suspected coercion is inferred from a presence of two currently valid authentications being held at the document execution server.

19. A method in accordance with claim 18 wherein the biometric data is fingerprint data and the biometric sensor is a fingerprint sensor.

20. A method in accordance with claim 19 further comprising downloading a read-only version of the document to the signature application on the mobile device even when the permission signal indicates the unsuccessful comparison.

21. A method in accordance with claim 20 further comprising the signature application on the mobile device downloading a read-only version of the document even when the permission signal received indicates the unsuccessful comparison.

22. The method of claim 18 wherein the stored biometric data is an encrypted fingerprint.

23. The method of claim 18 further comprising:

enabling the document execution server to reject the document after allowing the document to be signed and sent to the document execution server via the mobile network.

24. The method of claim 18 which further comprises:

collecting a time stamp audit during at least one of steps (a) through (f), and attaching the at least one time stamp audit to the document.

\* \* \* \* \*